(12) United States Patent
Szabo

(10) Patent No.: US 12,139,433 B2
(45) Date of Patent: Nov. 12, 2024

(54) GLASS POWDER PRODUCTS, AND PROCESSES AND SYSTEMS FOR THE PRODUCTION THEREOF

(71) Applicant: Rayan Investments Ltd., Moncton (CA)

(72) Inventor: Craig Szabo, Ottawa (CA)

(73) Assignee: Rayan Investments Ltd., Moncton (CA)

( * ) Notice: Subject to any disclaimer, the term of this patent is extended or adjusted under 35 U.S.C. 154(b) by 564 days.

(21) Appl. No.: 17/252,474

(22) PCT Filed: Jun. 14, 2019

(86) PCT No.: PCT/CA2019/050844
§ 371 (c)(1),
(2) Date: Dec. 15, 2020

(87) PCT Pub. No.: WO2019/237207
PCT Pub. Date: Dec. 19, 2019

(65) Prior Publication Data
US 2021/0188694 A1  Jun. 24, 2021

(30) Foreign Application Priority Data
Jun. 15, 2018 (CA) .................................. CA 3008311

(51) Int. Cl.
*C03C 12/00* (2006.01)
*B03B 9/06* (2006.01)
(Continued)

(52) U.S. Cl.
CPC ................ *C03C 1/002* (2013.01); *B03B 9/06* (2013.01); *C03C 12/00* (2013.01); *C09D 7/61* (2018.01); *C09J 11/04* (2013.01)

(58) Field of Classification Search
CPC ........... B03B 9/06; C03C 1/002; C03C 12/00; C09D 7/61; C09J 11/04
See application file for complete search history.

(56) References Cited

U.S. PATENT DOCUMENTS 6,464,082 B1 * 10/2002 Kimmel ................ B07C 5/3427
241/24.22
2002/0000178 A1   1/2002 Greco
(Continued)

FOREIGN PATENT DOCUMENTS

JP        2011235252 A   * 11/2011

OTHER PUBLICATIONS

International Search Report and Written Opinion regarding PCT Appl. No. PCT/CA2019/050844, mail date Sep. 27, 2019, 7 pps.

*Primary Examiner* — Shuangyi Abu Ali
(74) *Attorney, Agent, or Firm* — Foley & Lardner LLP

(57) ABSTRACT

Provided herein are processes for preparing glass powder product, the process including steps of: providing a crushing waste glass: sorting the crushed waste glass in a primary air classifier to provide a first stream and a reject stream, the first stream comprising a pulverized glass within a predetermined first particle size range and the reject stream comprising crushed waste glass excluded from the first stream: separating the reject stream based on size to provide a coarse stream and a fine stream, the fine stream having a predetermined second particle size range; and milling the first and fine streams to provide the glass powder product. Glass powder products, as well as systems for producing such glass powder products, are also provided.

19 Claims, 10 Drawing Sheets

(51) Int. Cl.
  *C03C 1/00* (2006.01)
  *C09D 7/61* (2018.01)
  *C09J 11/04* (2006.01)

(56) References Cited

U.S. PATENT DOCUMENTS

| 2008/0295740 | A1* | 12/2008 | Grasso, Jr. | C04B 28/04 |
| | | | | 241/24.1 |
| 2009/0283018 | A1* | 11/2009 | Grasso, Jr. | B02C 21/00 |
| | | | | 241/99 |
| 2014/0130553 | A1* | 5/2014 | Duffy | C03C 1/10 |
| | | | | 241/34 |

* cited by examiner

GLASS POWDER PRODUCTS, AND PROCESSES AND SYSTEMS FOR THE PRODUCTION THEREOF

CROSS-REFERENCE TO RELATED APPLICATIONS

This Application is a U.S. national stage of international patent application PCT/CA2019/050844, filed on Jun. 14, 2019, which claims the benefit of Canada Application No. 3008311, filed on Jun. 15, 2018.

FIELD OF INVENTION

The present invention relates generally to glass powder products. More specifically, the present invention relates to ultra-fine glass powder products, as well as systems and processes for the production thereof.

BACKGROUND

Fine powder products have a wide variety of uses in industrial, commercial, and consumer operations and products. By way of example, fine powder products are commonly employed in diverse applications spanning from use as an abrasive in sand blasting, to use in cements, to use as a filler or extender in paints or other such coatings. Fine powder products have been used as fillers/extenders in paint for a number of years. Common fine powder products include, among others, fillers/extenders produced from mined naturally occurring nepheline syenite mineral, feldspars, and clays, which have been used in premium paints and other coatings.

Glass-based fine powder products are desirable for a number of applications, given that glass is a generally inert material in many environments. There are many sources of relatively accessible glass material, including post-consumer glass waste such as bottles returned for recycling. Unfortunately, however, converting post-consumer glass waste and other such glass sources into suitable glass powder products can be quite challenging, particularly because post-consumer glass waste is typically contaminated with a number of undesirable materials which may include paper, plastic, aluminum, and organics, for example. Sorting and cleaning post-consumer waste glass materials can be energy and resource intensive, and can require complex apparatus. Traditional post-consumer glass waste treatment operations commonly involve a washing phase employing liquids such as water or water-based cleaning solutions, which then require a heating/drying phase to remove the liquid, creating further energy demand.

Furthermore, generating glass powder products at the ultra-fine grade having a narrow particle size range, which may be desirable in certain applications, presents a significant challenge, particularly where post-consumer glass waste is used as the feedstock for generating the glass powder product.

Alternative, additional, and/or improved glass powder products, as well as processes and systems for the preparation thereof, are desirable.

SUMMARY OF INVENTION

Described herein are glass powder products, and processes and systems for the generation thereof. Glass-based fine powder products are desirable for a variety of industrial and commercial applications, including as fillers/extenders for paints and other such coatings or adhesives. While sources of glass are readily available as post-consumer waste glass, the use of such glass to prepare fine powder products is challenging since post-consumer waste glass typically contains a number of contaminants which interfere with processing and glass powder product production.

Accordingly, provided herein are processes and systems for preparing glass powder products. Glass powder products are also provided. Processes and systems described herein may be used, for example, to prepare ultra-fine glass powder products from post-consumer waste glass (such as soda-lime type waste glass), the ultra-fine glass powder products having a generally leptokurtic particle size distribution curve, as may be desirable for use as filler/extender in paints and other such coatings or adhesives. In certain embodiments, by producing a first stream and a fine stream, and milling the first stream and the fine stream together, such ultra-fine glass powder products having a generally leptokurtic particle size distribution may be prepared from a crushed waste glass.

In an embodiment, there is provided herein a process for preparing a glass powder product, the process comprising steps of:
  providing a crushed waste glass;
  sorting the crushed waste glass in a primary air classifier to provide a first stream and a reject stream, the first stream comprising a pulverized glass within a predetermined first particle size range, and the reject stream comprising crushed waste glass excluded from the first stream;
  separating the reject stream based on size to provide a coarse stream and a fine stream, the fine stream having a predetermined second particle size range; and
  milling at least a portion of first stream and at least a portion of the fine stream to provide the glass powder product.

In another embodiment of the process, the step of providing the crushed waste glass may comprise providing a waste glass input feed, and crushing the waste glass input feed to provide the crushed waste glass.

In still another embodiment of the process or processes above, the predetermined first particle size range and the predetermined second particle size range may be different.

In yet another embodiment of the process or processes above, the predetermined first particle size range and the predetermined second particle size range may be partially overlapping.

In another embodiment of the process or processes above, the predetermined first particle size range and the predetermined second particle size range may not overlap.

In still another embodiment of the process or processes above, the process may be a dry process.

In another embodiment of the process or processes above, the process may further comprise:
  transferring at least a portion of the coarse stream to a crusher, crushing the coarse stream, and repeating the process using the crushed coarse stream as at least a portion of the crushed waste glass.

In yet another embodiment of the process or processes above, the process may further comprise:
  optionally, pre-screening the coarse stream to remove large contaminants; and
  treating the coarse stream in an Eddy current separator to remove aluminum or other non-ferrous metals and/or residual plastic before the step of transferring the coarse stream to the crusher.

In still another embodiment of the process or processes above, the step of separating may comprise:
  screening the reject stream on a screener.

In yet another embodiment of the process or processes above, the screener may comprise at least one screen for separating the reject stream into the coarse stream and the fine stream.

In another embodiment of the process or processes above, the screener may be a multi-deck screener comprising an upstream deck with a coarse mesh screen outputting the coarse stream and a downstream deck with a fine mesh screen outputting the fine stream.

In yet another embodiment of the process or processes above, the fine mesh screen of the downstream deck may have a mesh size of about 70 to about 100 mesh, or higher.

In yet another embodiment of the process or processes above, materials which pass through the coarse mesh screen but which do not pass through the fine mesh screen may be output as an intermediate stream.

In still another embodiment of the process or processes above, the multi-deck screener may further comprise one or more intermediate decks each with an intermediate mesh screen, for outputting one or more intermediate streams.

In another embodiment of the process or processes above, the one or more intermediate decks may be for outputting two or more intermediate streams, each having a different particle size range.

In yet another embodiment of the process or processes above, the multi-deck screener may comprise 1 to 3 sequentially arranged intermediate decks of progressively finer mesh size, the intermediate decks arranged downstream of the upstream deck and upstream of the downstream deck.

In still another embodiment of the process or processes above, the screens of the multi-deck screener may become progressively finer moving through the multi-deck screener.

In yet another embodiment of the process or processes above, the process may further comprise:
  using at least a portion of at least one intermediate stream to generate another glass-based product;
  transferring at least a portion of at least one intermediate stream to a crusher, crushing the intermediate stream, and repeating the process using the crushed intermediate stream as at least a portion of the crushed waste glass;
  or both.

In another embodiment of the process or processes above, the process may further comprise a step of:
  optionally, pre-screening the intermediate stream to remove large contaminants; and
  treating the intermediate stream in an Eddy current separator to remove aluminum or other non-ferrous metals and/or residual plastic before the step of using the intermediate stream or transferring the intermediate stream to the crusher.

In still another embodiment of the process or processes above, the process may further comprise:
  sorting at least a portion of the glass powder product in a secondary air classifier to provide a glass powder product stream within a predetermined particle size range, and a reject glass powder product stream comprising glass powder excluded from the glass powder product stream.

In yet another embodiment of the process or processes above, the process may further comprise:
  optionally, mixing at least a portion of the reject glass powder product stream with at least a portion of the first stream, at least a portion of the fine stream, or with a combined stream comprising at least a portion of the first stream and at least a portion of the fine stream; and
  re-milling to generate additional glass powder product.

In yet another embodiment of the process or processes above, the secondary air classifier may recover ultra-fine glass powder product based on material mass to air mass ratio within the secondary air classifier, thereby providing an ultra-fine glass powder product having a leptokurtic particle size curve as the glass powder product stream.

In still another embodiment of the process or processes above, the glass powder product may comprise an ultra-fine glass powder product having a predominantly leptokurtic particle size curve.

In another embodiment of the process or processes above, the process may further comprise a step of adjusting the ratio of the first stream to the fine stream to be milled, so as to provide the glass powder product as an ultra-fine glass powder product having a target leptokurtic particle size distribution.

In yet another embodiment of the process or processes above, the process may further comprise:
  generating at least a portion of the crushed waste glass or the waste glass input feed from post-consumer waste glass.

In still another embodiment of the process or processes above, the step of generating may comprise at least one of:
  crushing the post-consumer waste glass;
  treating the post-consumer waste glass in a high-temperature dryer to destroy paper, light plastic, and organic contaminants; and
  removing ferrous metal contaminants from the post-consumer waste glass.

In another embodiment of the process or processes above, the step of generating may comprise treating the post-consumer waste glass in the high-temperature dryer, and wherein the high-temperature dryer comprises a rotary kiln dryer.

In yet another embodiment of the process or processes above, the step of generating may comprise treating the post-consumer waste glass in the high-temperature dryer, and may further comprise cooling the post-consumer waste glass on a fluidized bed cooler.

In yet another embodiment of the process or processes above, the step of generating may comprise removing ferrous metal contaminants from the post-consumer waste glass, and wherein the ferrous metal contaminants are removed using belt in-line magnets.

In another embodiment of the process or processes above, the crushed waste glass may comprise glass from post-consumer waste glass which has been color-sorted.

In still another embodiment of the process or processes above, the crushed waste glass may comprise clear or white bottle glass, and is substantially free of colored glass.

In yet another embodiment of the process or processes above, the glass powder product may comprise a particle size D50 range from about 20 microns to about 1.2 microns.

In another embodiment of the process or processes above, the glass powder product may comprise a brightness level at or exceeding 96 L on a standardized CIE color scale (65/10 observant).

In yet another embodiment of the process or processes above, at least one vertical impact crusher may be used for crushing to provide the crushed waste glass.

In still another embodiment of the process or processes above, the primary air classifier may comprise a high-efficiency air classifier circuit.

In another embodiment of the process or processes above, the primary air classifier may toggle between cleaning mode and separation mode during operation to provide the first stream and the reject stream without becoming clogged.

In yet another embodiment of the process or processes above, the process may further comprise a step of periodically reversing a direction of a belt used for transporting the coarse stream to clear accumulated large non-glass waste into a trash stream.

In another embodiment of the process or processes above, the predetermined first particle size range of the first stream may be from about 5 to about 175 microns.

In yet another embodiment of the process or processes above, the predetermined second particle size range of the fine stream may be from about 20 to about 420 microns.

In still another embodiment of the process or processes above, a ratio of the first stream to the fine stream provided for milling may be about 60:40, and the first stream and the fine stream may be provided as a substantially or suitably heterogeneous mixture.

In yet another embodiment of the process or processes above, the fine stream may be milled in a ball mill prior to milling with the first stream.

In another embodiment of the process or processes above, the step of milling to provide the glass powder product may comprise milling in a ball mill with a charge porosity configured for production of ultra-fines.

In another embodiment of the process or processes above, the process may further comprise:
adding an anti-static grinding aid to the fine stream, the first stream, or a mixture of the fine stream and the first stream, prior to milling.

In another embodiment of the process or processes above, the process may further comprise:
subjecting the glass powder product to anti-static air jets to de-ionize the glass powder product and remove static to prevent clumping.

In another embodiment, there is provided herein a process for preparing a glass powder product, the process comprising:
providing a first stream comprising a pulverized glass within a first particle size range;
providing a fine stream comprising a pulverized glass within a second particle size range; and
milling the first stream and the fine stream to provide the glass powder product.

In another embodiment of the process, the first particle size range and the second particle size range may be different. In yet another embodiment of the process, the first particle size range and the second particle size range may be partially overlapping. In still another embodiment, the first particle size range and the second particle size range may not overlap.

In another embodiment, there is provided herein a glass powder product made by a process as described herein.

In yet another embodiment, there is provided herein a paint or other coating or adhesive comprising a glass powder product as described herein as a filler and/or extender.

In still another embodiment, there is provided herein a use of a glass powder product as described herein as a filler and/or extender.

In another embodiment, there is provided herein a system for preparing a glass powder product, the system comprising:
a crushed waste glass input;
a primary air classifier in communication with the crushed waste glass input and configured to receive a crushed waste glass therefrom and sort the crushed waste glass to provide a first stream and a reject stream, the first stream comprising a pulverized glass within a predetermined first particle size range, and the reject stream comprising crushed waste glass excluded from the first stream;
a separator in communication with the primary air classifier and configured to receive the reject stream therefrom and separate the reject stream based on size to provide a coarse stream and a fine stream, the fine stream having a predetermined second particle size range;
a mill configured to receive at least a portion of the first stream and at least a portion of the fine stream, or a mixture thereof, to mill the first stream and the fine stream to provide the glass powder product.

In another embodiment of the system, the system may further comprise a crusher configured to receive a waste glass input feed, to crush the waste glass input feed to provide a crushed waste glass, and to provide the crushed waste glass to the crushed waste glass input.

In still another embodiment of the system or systems above, the primary air classifier and the separator may be configured such that the predetermined first particle size range and the predetermined second particle size range are different.

In yet another embodiment of the system or systems above, the primary air classifier and the separator may be configured such that the predetermined first particle size range and the predetermined second particle size range are partially overlapping.

In another embodiment of the system or systems above, the primary air classifier and the separator may be configured such that the predetermined first particle size range and the predetermined second particle size range do not overlap.

In still another embodiment of the system or systems above, the system may be a dry system which does not input water, or may input water for cooling apparatus but which does not wet the glass.

In yet another embodiment of the system or systems above, the separator may be in communication with a crusher, and configured to transfer at least a portion of the coarse stream to the crusher to generate additional crushed glass waste.

In yet another embodiment of the system or systems above, the system may further comprise:
an Eddy current separator in communication with the separator and configured to receive the coarse stream from the separator and to treat the coarse stream to remove aluminum or other non-ferrous metals and/or residual plastic therefrom, the Eddy current separator further in communication with the crusher for transferring the coarse stream to the crusher following treatment.

In another embodiment of the system or systems above, the system may further comprise a pre-screen configured to remove large contaminants from the coarse stream prior to the coarse stream entering the Eddy current separator.

In another embodiment of the system or systems above, the separator may comprise a screener.

In yet another embodiment of the system or systems above, the screener may comprise at least one screen for separating the reject stream into the coarse stream and the fine stream.

In still another embodiment of the system or systems above, the screener may be a multi-deck screener comprising an upstream deck with a coarse mesh screen configured to output the coarse stream and a downstream deck with a fine mesh screen configured to output the fine stream.

In yet another embodiment of the system or systems above, the fine mesh screen of the downstream deck may have a mesh size of about 70 to about 100 mesh, or higher.

In another embodiment of the system or systems above, the system may be configured such that materials which pass through the coarse mesh screen but which do not pass through the fine mesh screen may be output as an intermediate stream.

In yet another embodiment of the system or systems above, the multi-deck screener may further comprise one or more intermediate decks each with an intermediate mesh screen, configured for outputting one or more intermediate streams.

In still another embodiment of the system or systems above, the one or more intermediate decks may be for outputting two or more intermediate streams, each having a different particle size.

In another embodiment of the system or systems above, the multi-deck screener may comprise 1 to 3 sequentially arranged intermediate decks of progressively finer mesh size, the intermediate decks arranged downstream of the upstream deck and upstream of the downstream deck.

In yet another embodiment of the system or systems above, the screens of the multi-deck screener may become progressively finer moving through the multi-deck screener.

In another embodiment of the system or systems above, the system may be configured to transfer at least a portion of at least one intermediate stream to a crusher to generate additional crushed waste glass.

In yet another embodiment of the system or systems above, the system may further comprise:
  an Eddy current separator configured to receive at least a portion of at least one intermediate stream and to treat the intermediate stream to remove aluminum or other non-ferrous metals and/or residual plastic therefrom.

In still another embodiment of the system or systems above, the Eddy current separator may be in communication with the crusher for transferring the intermediate stream to the crusher following treatment for further processing to generate additional crushed waste glass.

In yet another embodiment of the system or systems above, the system may further comprise a pre-screen configured to remove large contaminants from the intermediate stream prior to the intermediate stream entering the Eddy current separator.

In yet another embodiment of the system or systems above, the system may further comprise:
  a secondary air classifier in communication with the mill and configured to receive at least a portion of the glass powder product therefrom and to sort the glass powder product to provide a glass powder product stream within a predetermined particle size range, and a reject glass powder product stream comprising glass powder excluded from the glass powder product stream.

In another embodiment of the system or systems above, the secondary air classifier may be in communication with the mixing unit and/or the mill, and is configured to return the reject glass powder product stream back to the mill either alone or mixed with the first stream, the fine stream, or both, or a combined stream comprising the first stream and the fine stream, for further milling to generate additional glass powder product.

In still another embodiment of the system or systems above, the secondary air classifier may be configured to recover ultra-fine glass powder product based on material mass to air mass ratio within the secondary air classifier, thereby providing an ultra-fine glass powder product having a target leptokurtic particle size curve as the glass powder product stream.

In another embodiment of the system or systems above, the system may be configured to provide the glass powder product comprising an ultra-fine glass powder product having a leptokurtic particle size curve.

In yet another embodiment of the system or systems above, the system may be configured to allow adjustment of the ratio of the first stream to the fine stream to be milled, so as to provide the glass powder product as an ultra-fine glass powder product having a target leptokurtic particle size distribution.

In yet another embodiment of the system or systems above, at least a portion of the crushed waste glass or the waste glass input feed may be generated from a post-consumer waste glass, and wherein the system may further comprise at least one of:
  an initial crusher for crushing the post-consumer waste glass;
  a high-temperature dryer configured to destroy paper, light plastic, and organic contaminants contained in the post-consumer waste glass; and
  a magnet for removing ferrous metal contaminants from the post-consumer waste glass;
  which may be arranged along a path followed by the post-consumer waste glass, the path leading to the crushed waste glass input.

In yet another embodiment of the system or systems above, the system may comprise a crusher configured to receive a waste glass input feed, to crush the waste glass input feed to provide a crushed waste glass, and to provide the crushed waste glass to the crushed waste glass input; and wherein the path leads the post-consumer waste glass to the crusher, the post-consumer waste glass providing at least a portion of the waste glass input feed for the crusher.

In another embodiment of the system or systems above, the high temperature dryer may be in communication with the crusher through a fluidized bed cooler configured along the path to cool the post-consumer waste glass.

In yet another embodiment of the system or systems above, the high-temperature dryer may comprise a rotary kiln dryer.

In still another embodiment of the system or systems above, the magnet may be configured with a conveyor belt for removing ferrous metal contaminants from the post-consumer waste glass during transfer thereof.

In another embodiment of the system or systems above, the crusher may be a vertical impact crusher.

In still another embodiment of the system or systems above, the primary air classifier may comprise a high-efficiency air classifier circuit.

In another embodiment of the system or systems above, the primary air classifier may be configured to toggle between a cleaning mode and a separation mode during operation to provide the first stream and the reject stream without becoming clogged.

In yet another embodiment of the system or systems above, the system may further comprise a belt for transferring the coarse stream, wherein the belt is configured to periodically reverse direction to clear accumulated large non-glass waste into a trash stream.

In still another embodiment of the system or systems above, the primary air classifier may be configured to provide the first stream with the predetermined first particle size range being about 5 to about 175 microns.

In another embodiment of the system or systems above, the separator may be configured to provide the fine stream with the predetermined second particle size range being about 20 to about 420 microns.

In yet another embodiment of the system or systems above, the system may be configured to provide a feed rate of the first stream and the fine stream to the mill, or a mixing unit upstream thereof, such that a ratio of the first stream to the fine stream being milled is about 60:40, and such that the first stream and the fine stream are provided as a substantially heterogeneous mixture.

In another embodiment of the system or systems above, the system may further comprise a second mill configured to receive the fine stream from the separator and to mill the fine stream prior to milling with the first stream.

In yet another embodiment of the system or systems above, the second mill may comprise a ball mill.

In another embodiment of the system or systems above, the mill may be configured to receive the first stream and the fine stream, either separately or as a combined stream, and to perform milling to provide the glass powder product, wherein the mill comprises a ball mill with a charge porosity configured for production of ultra-fines.

In still another embodiment of the system or systems above, the system may further comprise:
an input for adding an anti-static grinding aid to the first stream, the fine stream, or a combined stream comprising the first stream and the fine stream, prior to milling.

In yet another embodiment of the system or systems above, the system may further comprise:
one or more antistatic air jets configured to remove static from the glass powder product.

In yet another embodiment, there is provided herein a process for preparing a glass powder product from a waste glass input feed, the process comprising steps of:
crushing the waste glass input feed in a crusher to provide a crushed waste glass;
sorting the crushed waste glass in a primary air classifier to provide a first stream and a reject stream, the first stream comprising a pulverized glass within a predetermined first particle size range, and the reject stream comprising crushed waste glass excluded from the first stream;
separating the reject stream based on size to provide a coarse stream and a fine stream, the fine stream having a predetermined second particle size range; and
milling the first stream and the fine stream to provide the glass powder product.

In still another embodiment of the process, the process may further comprise a step of:
returning the coarse stream to the crusher and using the coarse stream as at least a portion of the waste glass input feed to provide additional crushed waste glass for the process.

In another embodiment, there is provided herein a system for preparing a glass powder product from a waste glass input feed, the system comprising:
a crusher configured to crush the waste glass input feed to provide a crushed waste glass, and to provide the crushed waste glass to a crushed waste glass input;
a primary air classifier in communication with the crushed waste glass input and configured to receive the crushed waste glass and sort the crushed waste glass to provide a first stream and a reject stream, the first stream comprising a pulverized glass within a predetermined first particle size range, and the reject stream comprising crushed waste glass excluded from the first stream;
a separator in communication with the primary air classifier and configured to receive the reject stream therefrom and separate the reject stream based on size to provide a coarse stream and a fine stream, the fine stream having a predetermined second particle size range; and
a mill configured to receive the first stream and the fine stream, either separately or as a combined stream, and to mill the first stream and the fine stream to provide the glass powder product.

In another embodiment, the system may be configured to return the coarse stream to the crusher and use the coarse stream as at least a portion of the waste glass input feed to provide additional crushed waste glass.

In another embodiment, there is provided herein a process for preparing a glass powder product, the process comprising:
milling a feedstock comprising a first stream and a fine stream to provide the glass powder product,
wherein the first stream comprises a pulverized glass having a D50 of about 30 to about 65 micron; and
wherein the fine stream comprises a pulverized glass having a D50 of about 80 to about 210 micron.

In another embodiment of the process, the first stream may have a topcut (D98) of about 120 to about 170 micron. In another embodiment, the first stream may have a D10 of about 8 to about 15 micron. In yet another embodiment, the fine stream may have a topcut (D98) of about 140 to about 400 micron. In still another embodiment, the fine stream may have a D10 of about 50 to about 90 micron.

In yet another embodiment of the process or processes above, the first stream and the fine stream may be combined to form a combined stream prior to milling.

In yet another embodiment of the process or processes above, the combined stream may comprise a heterogeneous mixture of the first stream and the fine stream.

In still another embodiment of the process or processes above, the combined stream may comprise a plurality of interspersed layers of the first stream and layers of the fine stream.

In yet another embodiment of the process or processes above, the first stream and the fine stream may be separately supplied to a mill for the step of milling.

In another embodiment, there is provided herein a system for preparing a glass powder product, the system comprising:
a mill for milling a feedstock comprising a first stream and a fine stream to provide the glass powder product; and
one or more inputs for supplying the first stream and the fine stream, either separately or in combination, to the mill;
wherein the first stream comprises a pulverized glass having a D50 of about 30 to about 65 micron; and
wherein the fine stream comprises a pulverized glass having a D50 of about 80 to about 210 micron.

In another embodiment of the system, the first stream may have a topcut (D98) of about 120 to about 170 micron. In another embodiment, the first stream may have a D10 of about 8 to about 15 micron. In yet another embodiment, the fine stream may have a topcut (D98) of about 140 to about 400 micron. In still another embodiment, the fine stream may have a D10 of about 50 to about 90 micron.

In yet another embodiment of the system or systems above, the first stream and the fine stream may be combined to form a combined stream which is supplied to the mill by the one or more inputs.

In still another embodiment of the system or systems above, the combined stream may comprise a heterogeneous mixture of the first stream and the fine stream.

In yet another embodiment of the system or systems above, the combined stream may comprise a plurality of interspersed layers of the first stream and layers of the fine stream.

In still another embodiment of the system or systems above, the first stream and the fine stream may be separately supplied to the mill by the one or more inputs.

In another embodiment, there is provided herein a process for preparing a glass powder product, the process comprising steps of:
  providing a crushed waste glass;
  sorting the crushed waste glass with a separator to provide a first stream comprising a pulverized glass within a predetermined first particle size range, and a fine stream having a predetermined second particle size range; and
  milling at least a portion of first stream and at least a portion of the fine stream to provide the glass powder product.

In still another embodiment, there is provided herein a system for preparing a glass powder product, the system comprising:
  a crushed waste glass input;
  a separator in communication with the crushed waste glass input and configured to receive a crushed waste glass therefrom and sort the crushed waste glass to provide a first stream comprising a pulverized glass within a predetermined first particle size range, and a fine stream having a predetermined second particle size range; and
  a mill configured to receive at least a portion of the first stream and at least a portion of the fine stream, or a mixture thereof, and to mill the first stream and the fine stream to provide the glass powder product.

In yet another embodiment, there is provided herein a recycled glass-based powder product comprising one or more of:
  a brightness L* (CIE) of about 96% or greater;
  a color neutrality CIE with an a* value range of about −0.05 to about 0.45 and a b* value range of about −0.15 to about 0.80;
  a yellow index ASTM 313 of about −0.4 to about 1.5;
  a gloss value range at 20 deg on a glossmeter of about 1.6 to about 1.8 as measured in a test paint (ASTM D523);
  a gloss value range at 60 deg on a glossmeter of about 6 to about 7 as measured in a test paint (ASTM D523);
  a gloss value range at 85 deg on a glossmeter of about 9.5 to about 18 as measured in a test paint (ASTM D523);
  a gloss value range at 60 deg on a glossmeter of about 1.3 to about 2.5 (ASTM D523) as measured on a powder pellet;
  a white index (ASTM 313) of at least about 91;
  or any combination thereof.

In another embodiment, the recycled glass-based powder product may have a substantially leptokurtic particle size distribution.

In yet another embodiment, the recycled glass-based powder product may further comprise one or more of:
  a particle size range based on mean of about 1.5 to about 22 microns;
  a particle size D50 of about 1.2 microns to about 20 microns;
  a specific surface area range of about 9000 to about 27000 cm$^2$/mL;
  a particle size D10 of about 0.7 microns to about 5 microns;
  a particle size D98 of about 6 microns to about 55 microns;
  a refractive index of about 1.5;
  a round or angular particle shape;
  a micro-crystalline silica content of about 0; or
  or any combination thereof.

BRIEF DESCRIPTION OF DRAWINGS

In FIG. 1(A), the system is generating a first stream and a fine stream from a crushed waste glass, and in FIG. 1(B) the system is combining the first stream and the fine stream to provide a combined stream in an intermediate feed bin;

DETAILED DESCRIPTION

Figure 1:
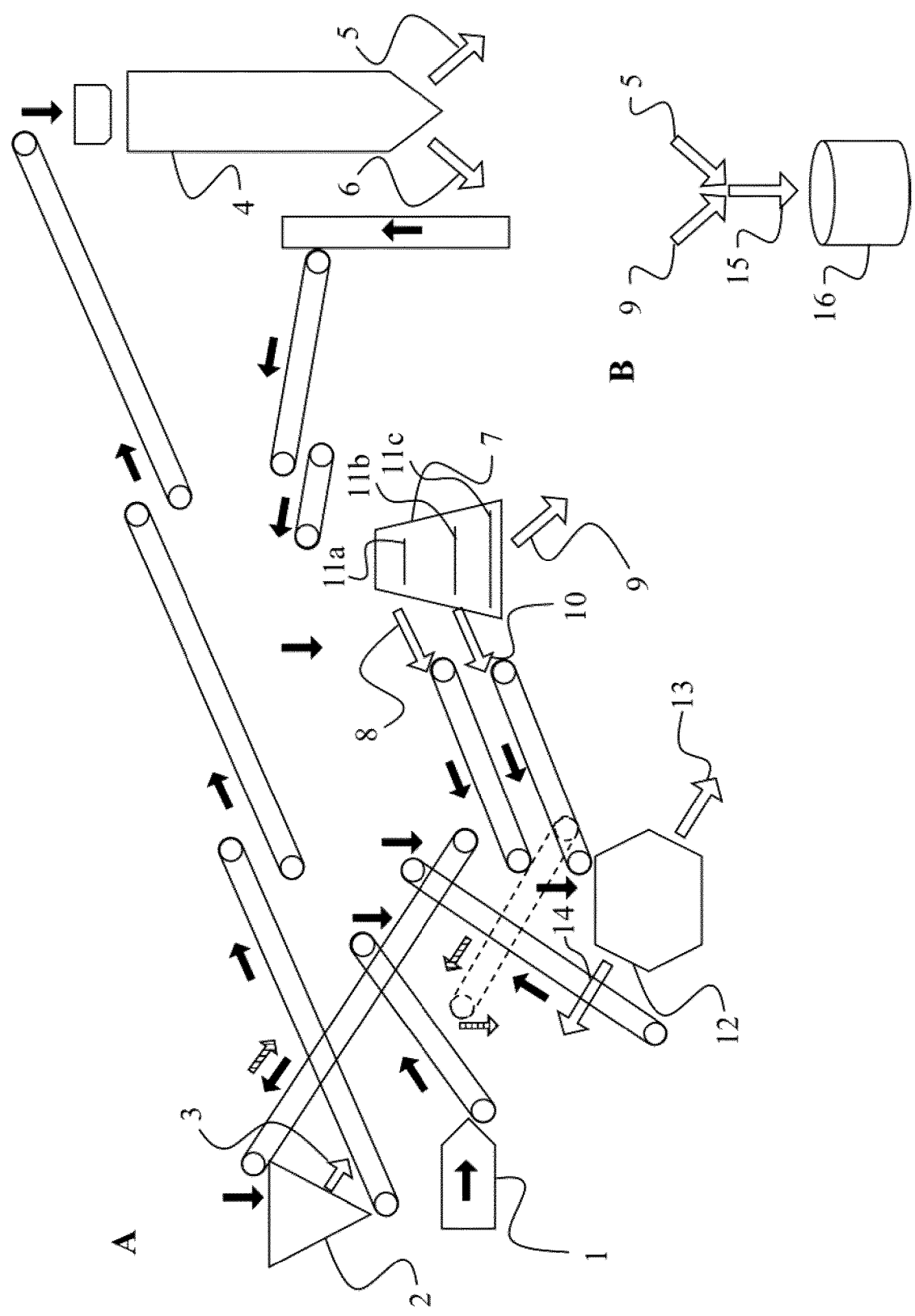
FIGS. 1(A) and 1(B) show schematic diagrams of an embodiment of a system for preparing a glass powder product as described herein, the system performing an embodiment of a process as described herein.

Described herein are glass powder products, and processes and systems for the generation thereof. It will be appreciated that embodiments and examples are provided for illustrative purposes intended for those skilled in the art, and are not meant to be limiting in any way.

While sources of glass are readily available as post-consumer waste glass, the use of such glass to prepare fine powder products has traditionally been challenging since post-consumer waste glass typically contains a number of contaminants which interfere with processing and glass powder product production. Accordingly, provided herein are processes and systems for preparing glass powder products, as well as glass powder products generated therefrom. Processes and systems described herein may be used, for example, to prepare ultra-fine glass powder products from post-consumer waste glass, the ultra-fine glass powder products having a generally leptokurtic particle size distribution curve as may be desirable for filler/extender in paints and other such coatings or adhesives. In certain embodiments, by producing a first stream and a fine stream, and milling the combined first stream and fine stream, such ultra-fine glass powder products having a generally leptokurtic particle size distribution may be prepared from a crushed waste glass.

Systems for Preparing Glass Powder Products

In an embodiment, there is provided herein a system for preparing a glass powder product, the system comprising:
 a crushed waste glass input;
 a primary air classifier in communication with the crushed waste glass input and configured to receive a crushed waste glass therefrom and sort the crushed waste glass to provide a first stream and a reject stream, the first stream comprising a pulverized glass within a predetermined first particle size range, and the reject stream comprising crushed waste glass excluded from the first stream;
 a separator in communication with the primary air classifier and configured to receive the reject stream therefrom and separate the reject stream based on size to provide a coarse stream and a fine stream, the fine stream having a predetermined second particle size range; and
 a mill configured to receive at least a portion of the first stream and at least a portion of the fine stream, or a mixture thereof, to mill the first stream and the fine stream to provide the glass powder product.

In another embodiment, the system may further comprise a mixing unit in communication with the primary air classifier and configured to receive the first stream therefrom, and in communication with the separator and configured to receive the fine stream therefrom, the mixing unit for combining at least a portion of the first stream and at least a portion of the fine stream to provide a combined stream which is supplied to the mill for milling.

In yet another embodiment, the system may further comprise a feed bin in communication with the primary air classifier and configured to receive the first stream therefrom, and in communication with the separator and configured to receive the fine stream therefrom, the feed bin for supplying a mixture of the first stream and the fine stream to the mill for milling. In certain embodiments, it is contemplated that the mixture of the first stream and the fine stream may be a substantially homogeneous mixture in the feed bin; however, typically the mixture of the first stream and the fine stream may be a substantially heterogeneous mixture of the first stream and the fine stream, with the mixture typically comprising a plurality of interspersed layers of the first stream and layers of the fine stream.

In still another embodiment, the system may further comprise a first feed bin in communication with the primary air classifier and configured to receive the first stream therefrom, and a second feed bin in communication with the separator and configured to receive the fine stream therefrom, the first and second feed bins for supplying respectively the first stream and the fine stream to the mill for milling. In certain embodiments, the mill will be supplied with at least some of the first stream, and at least some of the fine stream. Milling may cause mixing of the first stream and the fine stream, and provide the glass powder product.

As will be understood, the crushed waste glass input may input any suitable crushed waste glass feedstock, which may comprise contaminants typically found in post-consumer waste glass, into the system. The crushed waste glass feedstock may comprise finely crushed glass particles, as well as coarser glass particles.

The primary air classifier may be in communication with the crushed waste glass input, and configured to receive the crushed waste glass therefrom and to sort the crushed waste glass to provide a first stream comprising a pulverized glass within a predetermined first particle size range, and a reject stream comprising crushed waste glass excluded from the first stream. As will be understood, the primary air classifier may comprise any suitable air classifier unit known to the person of skill in the art having regard to the teachings herein. In certain embodiments, the primary air classifier may comprise, for example, any suitable high efficiency air classifier, such as those available from Fuller/FLS, Progressive, Hosokawa, Comex, or other such manufacturers. In certain embodiments, the primary air classifier may comprise, for example, a combined mill/classifier system, such as those available from Hosokawa (for example, the Micron Pulvis Agitating Media Mill).

The air classifier unit may comprise an air classifier which is configurable to sort the crushed waste glass, and to output the first stream comprising the pulverized glass within the predetermined first particle size range (i.e. may output a population of pulverized glass particles with sizes falling within a predetermined range). The predetermined first particle size range may be defined by an upper end size cut-off, or may be defined by an upper end size cut-off and a lower end size cut-off, which may be implemented by configuring settings of the air classifier unit accordingly. The predetermined first particle size range may be selected to suit the particular application, such that the first stream comprises pulverized glass particles each having a particle size which is below an upper threshold size and optionally above a lower threshold size, and having a population mean particle size within the predetermined first particle size range. The first stream may comprise pulverized glass particles, with a particle size distribution having an upper size cut-off corresponding with the upper threshold size, and optionally having a lower size cut-off corresponding with the lower threshold size.

The air classifier may be configured to sort the crushed waste glass into the first stream and the reject stream by adjusting, for example, the air volume rate, fan speed, and/or the classifier speed/rpm, for example. In such a manner, the first stream may be recovered separately from the reject stream, the reject stream containing materials from the crushed waste glass which were excluded from the first stream by the air classifier based, at least in part, on particle size. In certain embodiments, the primary air classifier may comprise a high-efficiency air classifier circuit. In certain embodiments, the primary air classifier may be configured to toggle between cleaning mode and separation mode during operation, to provide the first stream and the reject stream without becoming clogged.

The reject stream may then be provided to a separator, which separates the reject stream based on size to provide the coarse stream and the fine stream. The separator may include any separation unit suitable for sorting the reject stream input into at least a fine stream and a coarse stream. By way of example, the separator may comprise a screener or vibrating deck screen unit. The fine stream may comprise glass particles below a predetermined upper threshold size, and may be defined by a mechanical configuration of the separator. For example, the separator may comprise a vibrating screen unit having at least one screen, with a mesh size of the screen determining which particles are sorted to the fine stream and which particles are sorted to the coarse stream. In typical embodiments, the screener may be a vibratory deck screener. By way of example, in certain embodiments, screen mesh size, screen vibratory mode, and/or screen feedrate may be adjusted to achieve the desired particle size range of the fine stream.

The fine stream output from the separator may comprise glass particles having a predetermined second particle size range (i.e. the fine stream may comprise a population of pulverized glass particles with sizes falling within a predetermined range). The predetermined second particle size range may be defined by an upper end size cut-off, or may be defined by an upper end size cut-off and a lower end size cut-off, which may be implemented by configuring settings of the separator accordingly. The predetermined second particle size range may be selected to suit the particular application, such that the fine stream comprises pulverized glass particles each having a particle size which is below an upper threshold size and optionally above a lower threshold size, and having a population mean particle size within the predetermined second particle size range. The fine stream may comprise pulverized glass particles, with a particle size distribution having an upper size cut-off corresponding with the upper threshold size, and optionally having a lower size cut-off corresponding with the lower threshold size.

In certain embodiments of the systems described herein, the primary air classifier and the separator may be configured such that the predetermined first particle size range of the first stream and the predetermined second particle size range of the fine stream are different from each other. In certain embodiments, the primary air classifier and the separator may be configured such that the predetermined first particle size range and the predetermined second particle size range are partially overlapping. In certain embodiments, the primary air classifier and the separator may be configured such that the predetermined first particle size range and the predetermined second particle size range do not overlap. In certain embodiments, the first particle size range may be finer than the second particle size range.

In certain embodiments, the first stream may comprise a D50 of about 30 to about 65 microns. In certain embodiments, the fine stream may comprise a D50 of about 80 to about 210 microns. In certain embodiments, the first stream may comprise a topcut (D98) of about 120 to about 170 microns. In certain embodiments, the fine stream may comprise a topcut (D98) of about 140 to about 400 microns. In certain embodiments, the first stream may comprise a D10 of about 8 to about 15 microns. In certain embodiments, the fine stream may comprise a D10 of about 50 to about 90 microns. In certain further embodiments, one or more of the D50, D98, and/or D10 of the first stream may be defined by any suitable sub-range falling within any of the D50, D98, and/or D10 first stream ranges noted above, respectively, such as any suitable sub-range bounded at lower and upper ends by any integer values (or values rounded to the nearest tenth of a micron) at or between the upper and lower values noted above. In certain further embodiments, one or more of the D50, D98, and/or D10 of the fine stream may be defined by any suitable sub-range falling within any of the D50, D98, and/or D10 fine stream ranges noted above, respectively, such as any suitable sub-range bounded at lower and upper ends by any integer values (or values rounded to the nearest tenth of a micron) at or between the upper and lower values noted above. In certain embodiments, one or more of the D50, D98, and/or D10 of the first stream, the fine stream, or both, may be any suitable integer value (or value rounded to the nearest tenth of a micron) selected from the ranges noted above.

In certain embodiments, the first stream may comprise a pulverized glass within a predetermined first particle size range. In certain embodiments, the predetermined first particle size range may be from about 5 microns (lower) to about 175 microns (upper), or any suitable sub-range falling therebetween, such as a sub-range bounded at lower and upper ends by any integer values (or values rounded to the nearest tenth of a micron) at or between 5 microns and 175 microns.

In certain embodiments, the fine stream may comprise a pulverized glass within a predetermined second particle size range. In certain embodiments, the predetermined second particle size range may be from about 20 microns (lower) to about 420 microns (upper), or any suitable sub-range falling therebetween, such as a sub-range bounded at lower and upper ends by any integer values (or values rounded to the nearest tenth of a micron) at or between 20 microns and 420 microns.

In certain embodiments, the first stream and the fine stream may have one or more properties according to the following:

| First Stream: | | | | |
| --- | --- | --- | --- | --- |
| | Lower (micron) | Upper (micron) | | |
| D50 | 30 | 65 | Lower Size (micron): | 5 |
| D10 | 8 | 15 | Upper Size (micron): | 175 |
| Topcut (D98) | 120 | 170 | | |

| Fine Stream: | | | | |
| --- | --- | --- | --- | --- |
| | Lower (micron) | Upper (micron) | | |
| D50 | 80 | 210 | Lower Size (micron): | 20 |
| D10 | 50 | 90 | Upper Size (micron): | 420 |
| Topcut (D98) | 140 | 400 | | |

As will be understood, the sizing of the first stream and/or the fine stream may be selected based on the particular application, the system and/or method configuration being used, and/or the desired properties of the resulting product to be produced. Accordingly, it is contemplated that in certain embodiments the sizing of the first stream and/or the fine stream may vary from those described above.

Figure 7:
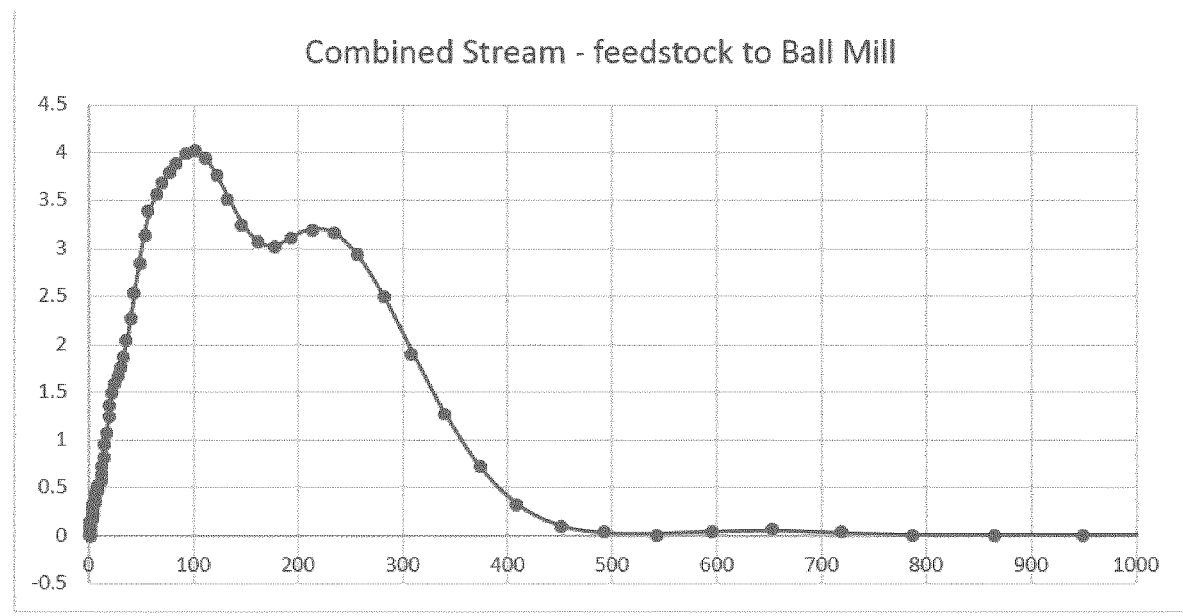
FIG. 7 shows an example of a particle size distribution of an example of a combined stream comprising a first stream and a fine stream as described herein, having a bimodal particle size distribution.

As will be understood, in certain embodiments, at least a portion of the first stream and at least a portion of the fine stream may be combined to provide a combined stream for milling. In certain embodiments, because the combined stream is prepared from the first stream and the fine stream, the combined stream may be a bi-modal stream in terms of particle size distribution therein (i.e. there may be two size peaks when graphing particle sizes as a probability density function). An example of size distribution of a combined stream comprising the first stream and the fine stream is shown in FIG. 7, charting differential volume versus particle diameter chart, in which peak A is in a range of about 90 to about 110 micron, and peak B is in a range of about 194 to about 234 micron.

In certain embodiments, the system may comprise a mixing unit in communication with the primary air classifier and configured to receive the first stream therefrom, and in communication with the separator and configured to receive the fine stream therefrom, the mixing unit configured to combine at least a portion of the first stream with at least a portion of the fine stream to provide the combined stream. The mixing unit may include any suitable mixing apparatus known to the person of skill in the art having regard to the teachings herein. By way of example, in an embodiment, mixing unit may comprise an intermediate feed bin, which receives the first stream from the primary air classifier and the fine stream from the separator, and combines the first stream and the fine stream therein to provide the combined stream, which may be a substantially heterogeneous mixture of the first stream and the fine stream. While it is contemplated that in certain embodiments the combined stream may be a substantially homogeneous mixture of the first stream and the fine stream, the combined stream will more typically be a substantially heterogeneous mixture comprising a plurality of interspersed layers of the first stream and layers of the fine stream. The intermediate feed bin may be designed to allow for mass flow discharge of the combined stream therefrom to avoid particle size segregation. The ratio of the first stream to the fine stream in the combined stream may comprise any suitable ratio, which may be selected to suit the configuration of the mill and/or the desired properties of the glass powder product output therefrom. In certain embodiments, a ratio of the first stream to the fine stream in the combined stream may be about 60:40, and the combined stream may be substantially heterogeneous. In certain embodiments, the intermediate feed bin may comprise a suitable mass flow bin, where the first and fine streams enter the bin at a substantially central position at the top of the feed bin, which may result in formation of microlayers of the first and fine streams in the feed bin as the streams are introduced thereto. Controlled withdrawal of the combined stream from the feed bin may result in some blending.

In certain embodiments, a micro-heterogeneous feed stock may be produced and supplied to the mill. In embodiments where separate feed bins are used for the first and fine streams, there may be mass ratio selection at the ball mill entrance to control ratio of the first and fine streams provided to the mill. In certain embodiments, a 60:40 ratio of first stream to fine stream may be used, although it is contemplated that a range of other ratios may be used depending on the particular configuration, and application. For example, in certain embodiments the ratio may be about 40 to about 80 of the first stream to about 20 to about 60 of the fine stream, or any suitable sub-ranges or integer values falling therein.

In another embodiment of the systems described herein, the system may be configured to provide a feed rate of the first stream and the fine stream to the mixing unit (or to the mill, depending on configuration) such that the combined stream (or the feed supplied to the mill) has a ratio of the first stream to the fine stream of about 60:40, for example, or another suitable ratio.

The combined stream may then be provided to a mill of the system, such as a ball mill, configured for milling the combined stream to provide the glass powder product. Alternatively, in another embodiment, the first stream and the fine stream may be combined by inputting the first stream into the mill, inputting the fine stream into the mill, and combining the first stream and the fine stream in the mill as part of the milling to provide the glass powder product. By way of example, in certain embodiments, the system may comprise a first feed bin in communication with the primary air classifier and configured to receive the first stream therefrom, and a second feed bin in communication with the separator and configured to receive the fine stream therefrom, the first and second feed bins for supplying respectively the first stream and the fine stream to the mill for milling. In certain embodiments, the mill will be supplied with at least some of the first stream, and at least some of the fine stream. Milling may cause mixing of the first stream and the fine stream, and provide the glass powder product. Such configuration may allow for control over ratios of the first and fine streams input to the mill.

As will be understood, the mill may comprise any suitable milling unit as will be known to the person of skill in the art having regard to the teachings herein. In certain embodiments, the mill may comprise a ball or media mill, although other mills such as a jet mill are also contemplated in certain embodiments. Typically, the mill will comprise a ball or media mill. In certain embodiments, the mill may comprise, for example, a ball mill. The mill may be configured to provide the glass powder product to a particular specification desired for the particular application. For example, the ball size, ball load, ball porosity, mill speed, mill liner type, and/or mill L/D ratio of the ball mill may be adjusted to provide the glass powder product output therefrom with a desired particle size profile. In yet another embodiment, the mill may comprise a ball mill with a charge porosity configured for production of ultra-fines. In certain embodiments, the ball mill may comprise a ceramic-lined ball mill with ceramic media of moderate porosity, for example.

In still another embodiment, the system may further comprise a second mill, the second mill configured to receive the fine stream from the separator and to mill the fine stream prior to combining the fine stream with the first stream at the mixing unit. In an embodiment, the second mill may comprise a ball mill.

In still another embodiment, the system may be configured with two ball mills. In such configuration, the first stream and fine stream may be supplied to a first ball mill which performs milling to generate an intermediate glass powder product, which may be sent to a second ball mill configured for ultra-fine processing for further milling to provide an ultra-fine glass powder product.

In certain embodiments of the systems described herein, the systems may be dry or waterless, and may be configured without an input for water or liquid. Whereas traditionally glass treatment systems have commonly employed a washing unit or other wet or liquid treatment apparatus, further triggering a need for resource-intensive water removal equipment, systems described herein may be configured without such exposure of the glass to liquid. Accordingly, a water removal apparatus may be omitted, or may be operated for less time and/or at lower temperature, since wetting of the glass may be avoided in the embodiments described herein.

In another embodiment, the system may further comprise a crusher configured to receive a waste glass input feed, to crush the waste glass input feed to provide a crushed waste glass, and to provide the crushed waste glass to the crushed waste glass input. In certain embodiments, the separator may be in communication with the crusher, or with another crusher, and may be configured to transfer at least a portion of the coarse stream to the crusher to generate additional crushed glass waste for repeating the process. In certain embodiments, the crusher may comprise a vertical impact crusher (such as a vertical impact glass crusher available from Remco, American Pulverizer, etc. . . . ), or another type of crusher such as a roller crusher (i.e. single and/or double), or a jaw crusher (i.e. a Pennsylvania type crusher), for example.

Accordingly, in certain embodiments, systems described herein may be configured to include a recirculation loop, whereby the coarse stream is crushed at the crusher, and returned to the air classifier for separation to produce additional first stream and/or reject stream. In certain embodiments, the coarse stream may be crushed at the crusher and then mixed in with crushed waste glass being directed to the primary air classifier. In certain embodiments, the coarse stream may be mixed with incoming waste glass input feed, and the coarse stream and incoming waste glass input feed may be crushed at the crusher to provide the crushed waste glass being sorted at the primary air classifier.

In another embodiment, the systems described herein may further comprise:
an Eddy current separator in communication with the separator and configured to receive the coarse stream from the separator and to treat the coarse stream to remove aluminum or other non-ferrous metals and/or residual plastic therefrom, the Eddy current separator further in communication with the crusher for transferring the coarse stream to the crusher following treatment.

In certain embodiments, the system may further comprise a pre-screen configured to remove large contaminants from the coarse stream prior to the coarse stream entering the Eddy current separator.

As will be understood, any suitable Eddy current separator unit known to the person of skill in the art having regard to the teachings herein may be used. Examples of Eddy current separators may include those available from Green Machine, Vibrotech, Master Magnets, Goudsmit, or others.

In certain embodiments of the systems described herein, the separator may comprise:
a screener (such as a vibratory screener) for screening the reject stream.

In another embodiment, the screener may comprise at least one screen for separating the reject stream into the coarse stream and the fine stream. In still another embodiment, the screener may be a multi-deck screener comprising an upstream deck with a coarse mesh screen outputting the coarse stream and a downstream deck with a fine mesh screen outputting the fine stream. In certain embodiments, the fine mesh screen of the downstream deck may have a mesh size of about 70 to about 100 mesh, or higher. In still another embodiment, the system may be configured such that materials which pass through the coarse mesh screen but which do not pass through the fine mesh screen may be output as an intermediate stream. In yet another embodiment, the multi-deck screener may further comprise one or more intermediate decks each with an intermediate mesh screen, for outputting one or more intermediate streams each having a different particle size range. In yet another embodiment, the one or more intermediate decks may be for outputting two or more intermediate streams, each having a different particle size range. In still another embodiment, the multi-deck screener may comprise 1 to 3 sequentially arranged intermediate decks of progressively finer mesh size, the intermediate decks arranged downstream of the upstream deck and upstream of the downstream deck. In still another embodiment, wherein the screens of the multi-deck screener may become progressively finer moving through the multi-deck screener.

In certain embodiments, the separator of the system may be configured to output at least one intermediate stream for use in generating another glass-based product, such as a glass-based product which does not require ultra-fine grade particles, such as a sand blasting abrasive product, another abrasive product, a product for glass counter-top production, or a glass-based product for coatings, aquarium glass, or other such uses, for example.

In certain embodiments, the system may be configured for outputting at least a portion of at least one intermediate stream to a crusher, which may be the same crusher described above or a different crusher, and crushing the intermediate to provide additional crushed waste glass for repeating the process.

Accordingly, in certain embodiments, systems described herein may be configured to include a recirculation loop, whereby the intermediate stream is crushed at the crusher, and returned to the air classifier for separation to produce additional first stream and/or reject stream. In certain embodiments, the intermediate stream may be crushed at the crusher and then mixed in with crushed waste glass being directed to the primary air classifier. In certain embodiments, the intermediate stream may be mixed with incoming waste glass input feed, and the intermediate stream and incoming waste glass input feed may be crushed at the crusher to provide the crushed waste glass being sorted at the primary air classifier.

In another embodiment of the systems described herein, the system may further comprise:
an Eddy current separator, which may be the same Eddy current separator above or a different Eddy current separator, configured to receive at least a portion of at least one intermediate stream and to treat the intermediate stream to remove aluminum or other non-ferrous metals and/or residual plastic therefrom.

In still another embodiment, where an intermediate stream is output from the separator, the system may further comprise:
optionally, a pre-screen for pre-screening the intermediate stream to remove large contaminants; and
an Eddy current separator, which may be the same Eddy current separator described above or a different Eddy current separator, which may be configured to receive the intermediate stream and to remove aluminum or other non-ferrous metals and/or residual plastic from the intermediate stream before using the intermediate stream or transferring the intermediate stream to the crusher.

In another embodiment, the system may be configured such that the Eddy current separator is in communication with the crusher, and may be configured for transferring the intermediate stream to the crusher following treatment at the Eddy current separator for further processing to generate additional crushed waste glass. As will be understood, any suitable Eddy current separator unit known to the person of skill in the art having regard to the teachings herein may be used.

In still another embodiment of the systems described herein, the system may further comprise:
a secondary air classifier in communication with the mill and configured to receive at least a portion of the glass powder product therefrom and to sort the glass powder product to provide a glass powder product stream within a predetermined particle size range, and a reject glass powder product stream comprising glass powder excluded from the glass powder product stream.

The predetermined particle size range may be defined by an upper end size cut-off, or may be defined by an upper end size cut-off and a lower end size cut-off, which may be implemented by configuring settings of the air classifier accordingly. The predetermined particle size range may be selected to suit the particular application, such that the glass powder product stream comprises pulverized glass particles each having a particle size which is below an upper threshold size and optionally above a lower threshold size, and having a population mean particle size within the predetermined particle size range. The glass powder product stream may comprise pulverized glass particles, with a particle size distribution having an upper size cut-off corresponding with the upper threshold size, and optionally having a lower size cut-off corresponding with the lower threshold size. In certain embodiments, the glass powder product stream may comprise a glass powder product having a particular particle size distribution. In certain embodiments, the glass powder product may comprise a generally leptokurtic particle size distribution. In certain embodiments, the glass powder product stream may comprise ultra-fine glass powder product. Examples of glass powder products are described in further detail below.

In still another embodiment, the system may be configured to provide the recycled-glass powder product comprising an ultra-fine glass powder product having a leptokurtic particle size curve.

In certain embodiments, the recycled-glass powder product may have one or more properties according to the following:

| | Glass Powder Product: | | | |
|---|---|---|---|---|
| | Lower (micron) | Upper (micron) | | |
| D50 | 1.2 | 20 | Lower Size (micron): | 0.5 |
| D10 | 0.7 | 5 | Upper Size (micron): | 45 |
| Topcut (D98) | 6 | 55 | | |
| Mean | 1.5 | 22 | | |

In certain embodiments, the recycled-glass powder product may comprise a glass powder product having one or more of: a brightness L* (CIE) of about 96% or greater; a color neutrality CIE with an a* value range of about −0.05 to about 0.45 and a b* value range of about −0.15 to about 0.80; a yellow index ASTM 313 of about −0.4 to about 1.5; a gloss value range at 20 deg on a glossmeter of about 1.6 to about 1.8 as measured in a test paint (ASTM D523); a gloss value range at 60 deg on a glossmeter of about 6 to about 7 as measured in a test paint (ASTM D523); a gloss value range at 85 deg on a glossmeter of about 9.5 to about 18 as measured in a test paint (ASTM D523); a gloss value at 60 deg on a glossmeter of about 1.3 to about 2.5 (ASTM D523) as measured on a powder pellet; a white index (ASTM 313) of at least about 91; or any combination thereof. In certain embodiments, the glass powder product may have a substantially leptokurtic particle size distribution. In certain embodiments, the glass powder product may have comprise one or more of: a particle size range based on mean of about 1.5 to about 22 microns; a specific surface area range of about 9000 to about 27000 cm2/mL; a particle size D10 of about 0.7 microns to about 5 microns; a particle size D98 of about 6 microns to about 55 microns; a particle size D50 of about 1.2 to about 20 microns; a refractive index of about 1.5; a round or angular particle shape; a microcrystalline silica content of about 0; or any combination thereof.

In still another embodiment, the secondary air classifier may be in communication with the mixing unit (or the feed bin(s)) and/or the mill, and may be configured to return the reject glass powder product stream back to the mill either alone or mixed with the first stream, the fine stream, or both, or a combined stream comprising the first stream and the fine stream, for further milling to generate additional glass powder product. In certain embodiments, a ratio of the reject glass powder product stream to the combined stream may be adjusted based on the particular application to provide suitable glass powder product.

Accordingly, in certain embodiments, systems described herein may include a recirculation loop, whereby the reject glass powder product stream is returned to the mill to produce additional glass powder product stream. In certain embodiments, the reject glass powder product stream may be milled, or may be mixed with additional combined stream and milled.

In yet another embodiment, the secondary air classifier may be configured to recover ultra-fine glass powder product based on material mass to air mass ratio within the secondary air classifier, thereby providing an ultra-fine glass powder product having a target leptokurtic particle size curve as the glass powder product stream. By way of example, classifier speed (RPM), fan flow rate, and/or internal mechanical modifications (i.e. spacing of classifier vanes) may be adjusted to provide a target particle size distribution of the glass powder product stream output from the secondary air classifier.

In still another embodiment of the processes described herein, the glass powder product, or the glass powder product stream, may comprise a particle size D50 range from about 20 microns to about 1.2 microns.

In another embodiment of the systems described herein, the system may be configured to allow adjustment of the ratio of the first stream to the fine stream to be milled so as to provide the glass powder product as an ultra-fine glass powder product having a target leptokurtic particle size distribution, for example.

In certain embodiments of the systems described herein, wherein at least a portion of the crushed waste glass or the waste glass input feed is generated from a post-consumer waste glass, the system may further comprise at least one of:
    an initial crusher for crushing the post-consumer waste glass;
    a high-temperature dryer configured to destroy paper, light plastic, and organic contaminants contained in the post-consumer waste glass; and
    a magnet for removing ferrous metal contaminants from the post-consumer waste glass.

The initial crusher, high-temperature dryer and magnet being arranged along a path followed by the post-consumer waste glass, the path leading to the crushed waste glass input.

In certain embodiments, the system may comprise a crusher configured to receive a waste glass input feed, wherein the crusher may be the crusher described above or a different crusher, to crush the waste glass input feed to provide a crushed waste glass, and to provide the crushed waste glass to the crushed waste glass input. In certain embodiments, the path may lead the post-consumer waste glass to the crusher, the post-consumer waste glass providing at least a portion of the waste glass input feed for the crusher, for example. In yet another embodiment, at least one vertical impact crusher may be used for crushing to provide the crushed waste glass.

In still another embodiment, the high temperature dryer may be in communication with the crusher, or with the crushed waste glass input, through a fluidized bed cooler configured along the path to cool the post-consumer waste glass. In certain embodiments, the high-temperature dryer may comprise a rotary kiln dryer.

In still another embodiment of the systems described herein, the magnet may be configured with a conveyor belt for removing ferrous metal contaminants from the post-consumer waste glass during transfer thereof, or may be configured in proximity with the post-consumer waste glass in another manner as will be known to the skilled person having regard to the teachings herein such that ferrous contaminants may be removed by the magnet.

In certain embodiments, the crushed waste glass may comprise glass from post-consumer waste glass which has been color-sorted. In certain embodiments, the crushed waste glass may comprise a green glass, producing a green glass powder product. In certain embodiments, the crushed waste glass may comprise clear glass, and may be substantially free of colored glass, producing a white glass powder product. In yet another embodiment of the systems described herein, the glass powder product may comprise a brightness level at or exceeding 96 L on a standardized CIE scale (65/10 observant).

In yet another embodiment, the systems as described herein may be configured to periodically reverse a direction of a belt used for transporting the coarse stream, in order to clear accumulated large non-glass waste of the coarse stream out of the system and into a trash stream.

In still another embodiment, the systems described herein may further comprise:
an input for adding an anti-static grinding aid to the first stream, the fine stream, or both, or to a combined stream comprising the first stream and the fine stream, prior to milling.

As will be understood, the grinding aid may comprise any suitable anti-static grinding aid material, serving to dissipate charge accumulation on the glass particles. In certain embodiments, the anti-static grinding aid may be added via a pump controlled by feed rate to the mill, so that dosage may be kept substantially constant. Grinding aids, and water-diluted versions thereof, may be commercially obtained from various sources. In certain embodiments, a grinding aid may include a grinding aid commercially available from WR Grace (i.e. HEA2, MTDA), Chryso, or ProDexim, for example.

In still another embodiment of the systems described herein, the system may further comprise:
one or more antistatic air jets configured to remove static from the glass powder product.

In still another embodiment, there is provided herein a system for preparing a glass powder product from a waste glass input feed, the system comprising:
a crusher configured to crush the waste glass input feed to provide a crushed waste glass, and to provide the crushed waste glass to a crushed waste glass input;
a primary air classifier in communication with the crushed waste glass input and configured to receive the crushed waste glass and sort the crushed waste glass to provide a first stream and a reject stream, the first stream comprising a pulverized glass within a predetermined first particle size range, and the reject stream comprising crushed waste glass excluded from the first stream;
a separator in communication with the primary air classifier and configured to receive the reject stream therefrom and separate the reject stream based on size to provide a coarse stream and a fine stream, the fine stream having a predetermined second particle size range; and
a mill configured to receive the first stream and the fine stream, either separately or as a combined stream, and to mill the first stream and the combined stream to provide the glass powder product.

In another embodiment, the system may be configured to return the coarse stream to the crusher and use the coarse stream as at least a portion of the waste glass input feed to provide additional crushed waste glass.

Figure 2:
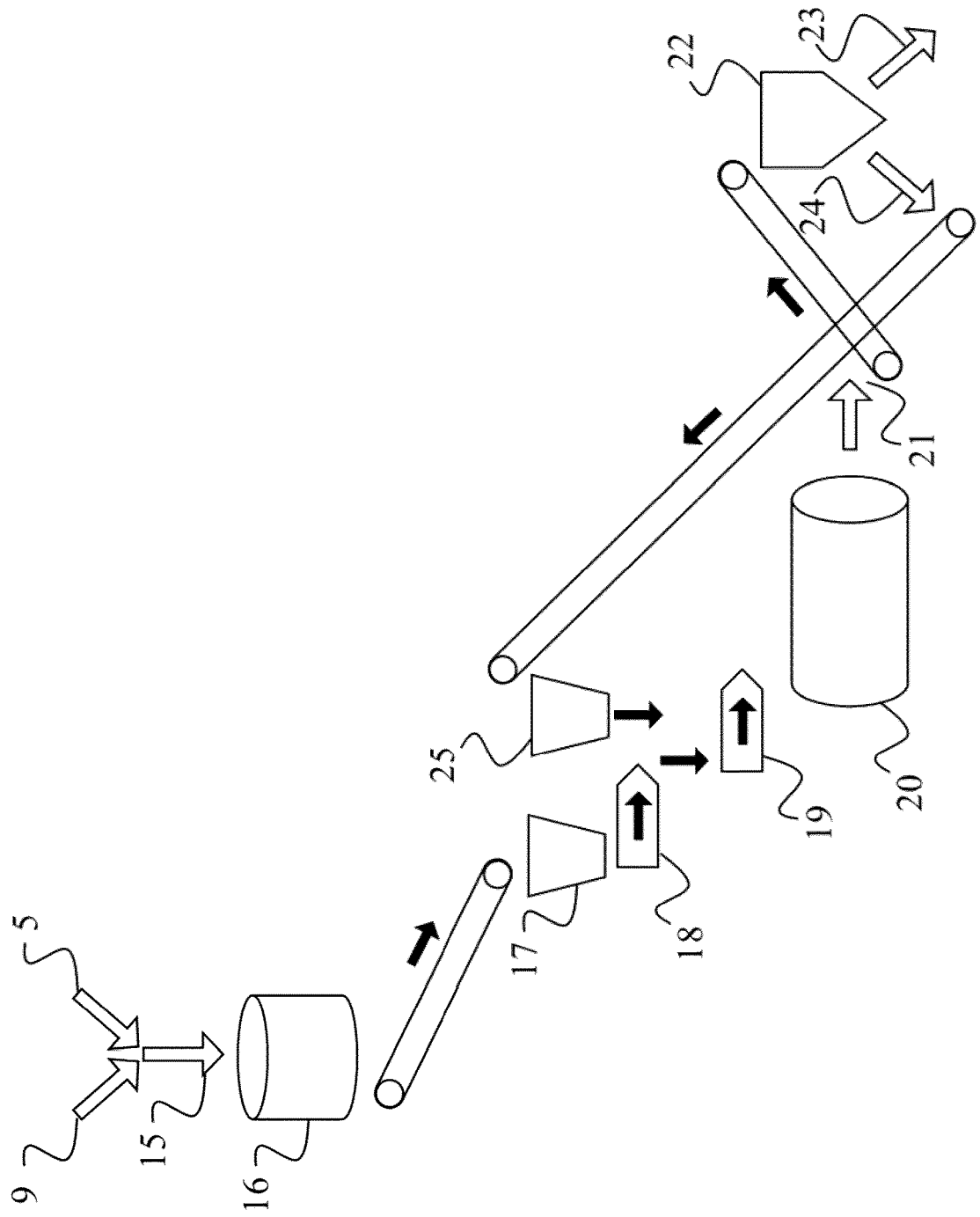
FIG. 2 shows a schematic diagram of additional downstream components of the system embodiment depicted in FIG. 1, wherein the system further comprises a ball mill for milling the combined stream to provide the glass powder product.
Figure 3:
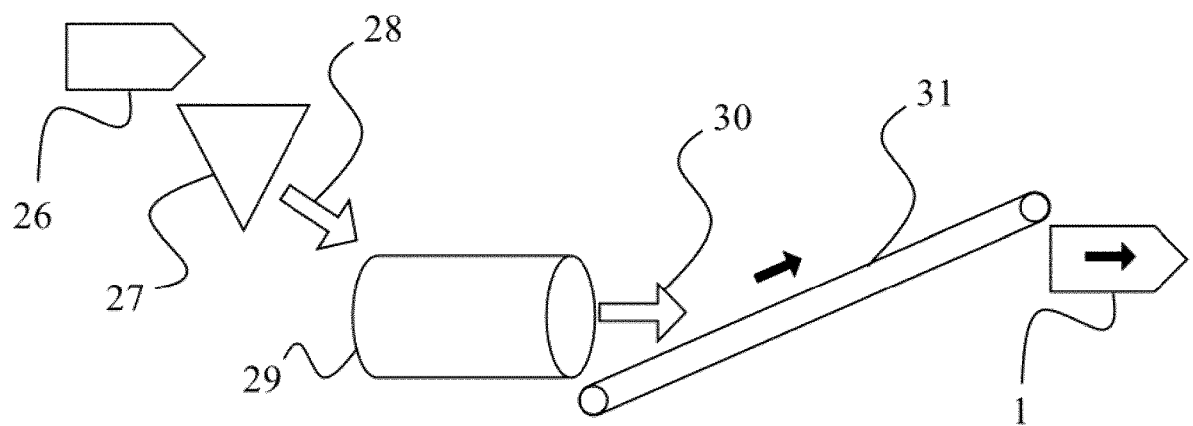
FIG. 3 shows a schematic diagram of additional upstream components of the system embodiment depicted in FIGS. 1 and 2, where the system further comprises a crusher and a high temperature dryer for generating crushed waste glass from a waste glass input feed.

An example of a system for preparing a glass powder product as described herein is depicted in FIGS. 1-3. With reference to FIGS. 1(A), 1(B), and 2, the depicted system example comprises:
a crushed waste glass input (3), the crushed waste glass input (3) configured to receive crushed waste glass from a vertical impact crusher (2), the vertical impact crusher (2) configured to receive a waste glass input feed (1) and to crush the waste glass input feed (1) to generate the crushed waste glass supplied to the crushed waste glass input (3);
a primary air classifier (4) in communication with the crushed waste glass input (3) via one or more belts, and configured to receive a crushed waste glass therefrom and sort the crushed waste glass to provide a first stream (5) and a reject stream (6), the first stream (5) comprising a pulverized glass within a predetermined first particle size range, and the reject stream (6) comprising crushed waste glass excluded from the first stream (5);
a separator (7) in communication with the primary air classifier (4) (in this example, via a vertical elevator and belts) and configured to receive the reject stream (5) therefrom and separate the reject stream (5) based on size to provide a coarse stream (8) and a fine stream (9), the fine stream (9) having a predetermined second particle size range;
a mixing unit (16) in communication with the primary air classifier (4) and configured to receive the first stream (5) therefrom, and in communication with the separator (7) and configured to receive the fine stream (9) therefrom, the mixing unit (16) for combining at least a portion of the first stream (5) and at least a portion of the fine stream (9) to provide a combined stream (15) therein; and
a mill (20) configured to receive the combined stream (15) (in this example, via a belt, feed hopper (17), and feed screws (18) and (19)) and to mill the combined stream (15) to provide the glass powder product (21).

In the depicted system example, the primary air classifier (4) and the separator (7) are configured such that the predetermined first particle size range and the predetermined second particle size range are different, and partially overlapping. Typically, the coarse end of the first stream may overlap with the fine end of the fine stream. In the depicted embodiment, the first stream (5) comprises a D50 range of about 45 to about 60 microns, and the fine stream (9) comprises a D50 range of about 120 to about 210 microns.

In the depicted example, the primary air classifier (4) is configured to toggle between a cleaning mode and a separation mode during operation to provide the first stream (5) and the reject stream (6) without becoming clogged. The primary air classifier (4) is configured to provide the first stream having a particle size in a range of about 45 to about 50 microns in this example.

As shown, the depicted system is a dry system, which does not input water or liquid.

In the depicted system, the separator (7) is in communication with the crusher (2), and configured to transfer at least a portion of the coarse stream (8) to the crusher (2) to generate additional crushed glass waste. The coarse stream (8) is added to the crusher (2) along with waste glass input feed (1), thus generating additional crushed waste glass which is provided to the crushed waste glass input (3). In the depicted example, the coarse stream (8) is conveyed by a series of belts, optionally through an Eddy current separator (12) as described below, to a main feed belt which is also used to covey the waste glass input feed (1) to the crusher (2).

As shown in FIG. 1(A), the system further comprises an Eddy current separator (12) in communication with the separator (7), and configured to receive the coarse stream (8) from the separator (7) and to treat the coarse stream (8) to remove aluminum or other non-ferrous metals and/or residual plastic therefrom, the Eddy current separator (12) further in communication with the crusher (2) for transferring the coarse stream (8) to the crusher (2) following treatment therein as described above. Although not shown, the system may further comprise a pre-screen configured to remove large contaminants from the coarse stream prior to the coarse stream entering the Eddy current separator. Where the Eddy current separator (12) is not used, or where it is desirable for the coarse stream (8) or a portion thereof to bypass the Eddy current separator (12), an optional bypass belt may be provided, as shown in dashed lines, for allowing the coarse stream (8), and/or intermediate stream (10) as described below, to bypass the Eddy current separator (12) and proceed to the main feed belt which is also used to covey the waste glass input feed (1) to the crusher (2).

In the depicted example, the main belt which transfers at least the coarse stream to the crusher (2) is configured to periodically reverse direction to clear accumulated large non-glass waste into a trash stream.

In the depicted system example, the separator (7) comprises a multi-deck screener having an upstream deck (11a) with a course mesh screen, and a downstream deck (11c) having a fine mesh screen. The upstream deck (11a) outputs materials retained thereon (i.e. materials too large to pass through the coarse mesh screen) as the coarse stream (8), and the downstream deck (11c) outputs materials passing therethrough (i.e. materials small enough to pass through the fine mesh screen) as the fine stream (9). In the depicted example, the fine mesh screen has a mesh size of about 70 to about 100 mesh.

As shown in FIG. 1(A), the system is configured such that materials which pass through the coarse mesh screen but which don't pass through the fine mesh screen are output as an intermediate stream (10). The multi-deck screener further comprises one or more intermediate decks (11b), each with an intermediate mesh screen, configured for outputting one or more intermediate streams. Thus, in the depicted embodiment, two intermediate streams (10) are output, one comprising materials too large to pass through the intermediate deck (11b) screen, and the other comprising materials small enough to pass through the intermediate deck (11b) but too large to pass through the fine mesh screen of the downstream deck (11c). The intermediate streams may be obtained separately and used for different applications, or may be recovered together with the intermediate deck (11b) being provided for increasing throughput by preventing clogging of the screen of the downstream deck (11c). As will be understood, the screens of the separator (7) become progressively finer moving through the multi-deck screener.

In the depicted system shown in FIG. 1(A), the two intermediate streams are combined as intermediate stream (10), and the system is configured to transfer intermediate stream (10) to the crusher (2) to generate additional crushed waste glass. The intermediate stream (10) is added to the crusher (2) along with coarse stream (8) and/or waste glass input feed (1) to generate additional crushed waste glass. As shown, the intermediate stream (10) of the depicted system is also provided to the Eddy current separator (12) en route to the crusher (2). The Eddy current separator (12) is in communication with the separator (7), and configured to receive the intermediate stream (10) therefrom in addition to receiving the coarse stream (8) therefrom, and to remove aluminum or other non-ferrous metals and/or residual plastic. The coarse stream (8) and the intermediate stream (10) are then transferred from the Eddy current separator (12) to the crusher (2) following treatment therein. Although not shown, the system may further comprise a pre-screen configured to remove large contaminants from the intermediate stream prior to the intermediate stream entering the Eddy current separator, which may or may not be the same pre-screen which may be provided in communication with the coarse stream.

Accordingly, in the system depicted in FIG. 1(A), there is a re-circulation loop in which certain materials from the waste glass input feed (1) which are not recovered in the first stream (5) and the fine stream (9) are circulated back, optionally via an Eddy current separator (12), to the crusher (2) and then through the cycle again.

As shown in FIG. 1(B) and FIG. 2, a mixing unit (16) is provided communication with the primary air classifier (4) and configured to receive the first stream (5) therefrom, and in communication with the separator (7) and configured to receive the fine stream (9) therefrom, the mixing unit (16) for combining at least a portion of the first stream (5) and at least a portion of the fine stream (9) to provide a bi-modal combined stream (15) therein. In the depicted embodiment, the mixing unit (16) comprises an intermediate feed bin. The mixing unit (16) is configured to allow for adjustment of the ratio of the first stream (5) to the fine stream (9) making up the combined stream (15), by adjusting feed rates of the first stream and the fine stream to the mixing unit (16), or otherwise controlling the ratio thereof in the combined stream (15). In the depicted system, the mixing unit (16) is configured to provide the combined stream (15) having a ratio of the first stream to the fine stream of about 60:40, the combined stream (15) being substantially homogenously mixed.

As shown in FIG. 2, the depicted system comprises a mill (20) configured to receive the combined stream (15) (in this example, via a belt, feed hopper (17), and feed screws (18) and (19)) and to mill the combined stream (15) to provide the glass powder product (21), the glass powder product (21) comprising an ultra-fine glass powder product having a target size range and a target generally leptokurtic particle size distribution. The depicted mill (20) is a ball mill with a charge porosity configured for production of ultra-fines.

As shown in FIG. 2, the depicted system example further comprises a secondary air classifier (22) in communication with the mill (20) via a belt and configured to receive at least a portion of the glass powder product (21) therefrom and to sort the glass powder product (21) to provide a glass powder product stream (23) within a predetermined particle size range, and a reject glass powder product stream (24) comprising glass powder excluded from the glass powder product stream (23). The secondary air classifier (22) may be in communication with the mixing unit (16) and/or the mill (20), and may configured to return the reject glass powder product stream (24) back to the mill (20) either alone or mixed with the combined stream (15) for further milling to generate additional glass powder product (21) or glass powder product stream (23). In the depicted embodiment, the secondary air classifier (22) is in communication with a second feed hopper (25), which supplies feed screw (19) which also carries combined stream (15) to the mill (20). In such manner, ratio of the combined stream to the reject glass powder product stream entering the mill may be adjusted.

Thus, in the depicted embodiment, the system comprises a second recirculation loop, whereby reject glass powder product stream (24) is recirculated through the mill (20) to generate additional glass powder product (21) and/or glass powder product stream (23).

In the depicted system, the secondary air classifier (22) is configured to recover ultra-fine glass powder product based on material mass to air mass ratio within the secondary air classifier (22), thereby providing an ultra-fine glass powder product having a leptokurtic particle size curve as the glass powder product stream (23).

In the depicted system embodiment, at least a portion of the crushed waste glass at the crushed waste glass input (3), or the waste glass input feed (1), is generated from post-consumer waste glass. As shown in FIG. 3, the waste glass input feed (1) is generated from a post-consumer waste glass (26). The depicted system further comprises an initial crusher (27) for crushing the post-consumer waste glass (26) (in this example, the crusher produces a crushed soda-lime glass feed with a size of about ½ inch or less); a high temperature rotary-kiln dryer (29) for destroying paper, light plastic, and organic contaminants contained in the post-consumer waste glass (in this example, the dryer air temperature is between about 400 and about 600° C. (material discharge temperature of about 250 C to about 300 C); and a magnet for removing ferrous metal contaminants from the post-consumer waste glass (arranged along conveyor belt (31)), which are arranged in sequence along a path followed by the post-consumer waste glass, the path leading to the crushed waste glass input (3), optionally via crusher (2). Although not shown, the high temperature dryer (29) of the depicted system is in communication with the crusher (2) through a fluidized bed cooler configured along the path to cool the post-consumer waste glass to a temperature of about 25-40° C.

In certain embodiments, the ball mill internals and other critical wear areas of the depicted system may be ceramic lined with white alumina-based ceramic to avoid product discoloration, where high product brightness and/or whiteness is desired.

Although not shown, the depicted system may further comprise a second mill, such as a ball mill, configured to receive the fine stream (9) from the separator (7) and to mill the fine stream (9) prior to combining with the first stream (5) at the mixing unit (16).

Although not shown, in certain embodiments the depicted system may further comprise a another mill, such as a ball mill, configured to receive the glass powder product from the mill, and further process the glass powder product to provide an ultra-fine glass powder product.

As well, although not shown, the depicted system may further comprise an input for adding an anti-static grinding aid to the combined stream (15) prior to milling at mill (20); and/or may comprise one or more antistatic air jets configured to remove static from the glass powder product (21) or glass powder product stream (23) being produced.

Produced glass powder product stream (23) may then be directed to product silos for packaging and shipment, for example.

As will also be understood, in certain embodiments, it is contemplated that the primary air classifier and separator configuration depicted in FIG. 1 may alternatively be configured with a single separator unit (i.e. a vibratory screener, for example). Accordingly, in certain embodiments, there is provided herein a system for preparing a glass powder product, the system comprising:
  a crushed waste glass input;
  a separator in communication with the crushed waste glass input and configured to receive a crushed waste glass therefrom and sort the crushed waste glass to provide a first stream comprising a pulverized glass within a predetermined first particle size range, and a fine stream having a predetermined second particle size range; and
  a mill configured to receive at least a portion of the first stream and at least a portion of the fine stream, or a mixture thereof, and to mill the first stream and the fine stream to provide the glass powder product.

An example of such a system is depicted in FIGS. 6(A) and 6(B), in which the depicted system comprises:
  a crushed waste glass input (3), the crushed waste glass input (3) configured to receive crushed waste glass from a vertical impact crusher (2), the vertical impact crusher (2) configured to receive a waste glass input feed (1) and to crush the waste glass input feed (1) to generate the crushed waste glass supplied to the crushed waste glass input (3);
  a separator (7) in communication with the crushed waste glass input (3) via one or more belts, and configured to receive a crushed waste glass therefrom and sort the crushed waste glass to provide a first stream (5) (in this example, from below a lower screen deck of the separator), the first stream (5) comprising a pulverized glass within a predetermined first particle size range, and a fine stream (9) (in this example, from above the lower screen deck), the fine stream (9) having a predetermined second particle size range;
  a first intermediate feed bin (38b) in communication with the separator (7) and configured to receive the first stream (5) therefrom, and a second intermediate feed bin (38a) in communication with the separator (7) and configured to receive the fine stream (9) therefrom; and
  a mill (20) configured to receive the first steam (5) and the fine stream (9) from the first and second intermediate feed bins (38b and 38a), and to mill the received first stream and fine stream, to provide the glass powder product (21).

In the depicted embodiment, the separator (7) is a multideck vibratory screener, which also outputs other intermediate glass powder streams depicted to the left of separator (7), which may be recirculated and/or treated by an Eddy current separator in much the same manner as already described above in relation to the configuration depicted in FIG. 1. In the depicted embodiment, a crushed ½" minus glass, after treatment in a high temperature dryer, was used to feed the crusher.

In the depicted embodiment, the first stream (5) was produced from the screener pan/fines as determined by use of a minimum #100 screen (or equivalent) as bottom screen and fed to a storage silo (i.e. feed bin 38b). Material from the top screen decks above #70 mesh was recirculated to the crusher system for further size reduction. The fine stream (9) was produced between #70 and #100 (or in similar range) screens, and was fed a separate storage silo (i.e. feed bin 38a; as depicted) or may alternatively be layered with first stream in a common silo as a micro-heterogeneous mixture.

Figure 6:
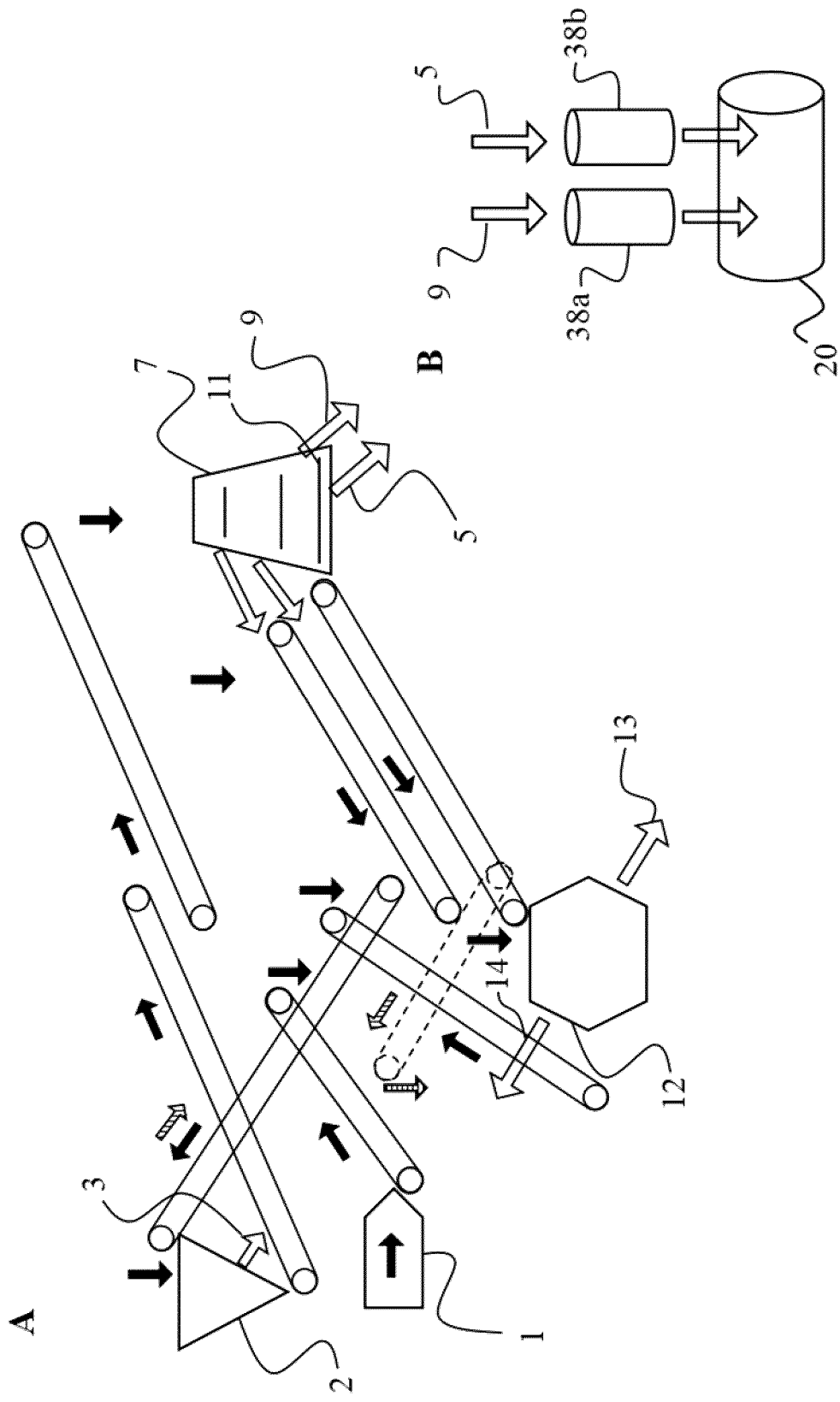
FIG. 6 shows a schematic diagram of another embodiment of a system for preparing a glass powder product as described herein, the system performing another embodiment of a process as described herein. The depicted system (shown in (A) and (B)) is generating a first stream and a fine stream from a crushed waste glass using a separator (i.e. a screener)

In embodiments in which a separator unit (i.e. a vibratory screener, or equivalent, for example) is used for generating the first stream as depicted in FIG. 6, rather than a primary air classifier, the first stream may, optionally, vary somewhat from the first stream already described hereinabove. By way of example, in certain embodiments, the first stream generated from the separator have one or more properties according to the following:

| | Lower (micron) | Upper (micron) | First Stream: | |
|---|---|---|---|---|
| D50 | 60 | 120 | Lower Size (micron): | 15 |
| D10 | 25 | 60 | Upper Size (micron): | 160 |
| Topcut (D98) | 100 | 150 | | |

Processes for Preparing Glass Powder Products

In another embodiment, there is provided herein a process for preparing a glass powder product, the process comprising steps of:
 providing a crushed waste glass;
 sorting the crushed waste glass to provide a first stream and a reject stream, the first stream comprising a pulverized glass within a predetermined first particle size range, and the reject stream comprising crushed waste glass excluded from the first stream;
 separating the reject stream based on size to provide a coarse stream and a fine stream, the fine stream having a predetermined second particle size range; and
 milling at least a portion of the first stream and at least a portion of the fine stream to provide the glass powder product.

As will be understood, the crushed waste glass may comprise any suitable crushed waste glass feedstock, and may comprise contaminants typically found in post-consumer waste glass. The crushed waste glass feedstock may comprise finely crushed glass particles, as well as coarser glass particles.

In certain embodiments of the processes described herein, the step of providing the crushed waste glass may comprise providing a waste glass input feed, and crushing the waste glass input feed to provide the crushed waste glass. The waste glass input feed may comprise any suitable glass feed, such as a feed of post-consumer waste glass.

The crushed waste glass may be sorted using, for example, a primary air classifier, to provide a first stream comprising a pulverized glass within a predetermined first particle size range, and a reject stream comprising crushed waste glass excluded from the first stream. As will be understood, the primary air classifier may comprise any suitable air classifier unit known to the person of skill in the art having regard to the teachings herein. The air classifier unit may comprise an air classifier which is configurable to sort the crushed waste glass, and to output the first stream comprising the pulverized glass within the predetermined first particle size range. The predetermined first particle size range may be defined by an upper end size cut-off, or may be defined by an upper end size cut-off and a lower end size cut-off, which may be implemented by configuring settings of the air classifier unit accordingly. The predetermined first particle size range may be selected to suit the particular application, such that the first stream comprises pulverized glass particles each having a particle size which is below an upper threshold size and optionally above a lower threshold size, and having a population mean particle size within the predetermined first particle size range. The first stream may comprise pulverized glass particles, with a particle size distribution having an upper size cut-off corresponding with the upper threshold size, and optionally having a lower size cut-off corresponding with the lower threshold size.

As will be understood, the primary air classifier may comprise any suitable air classifier unit known to the person of skill in the art, such as those already described above. The air classifier may be configured to sort the crushed waste glass into the first stream and the reject stream by adjusting the parameters such as those already described hereinabove. In such manner, the first stream may be recovered separately from the reject stream, the reject stream containing materials from the crushed waste glass which were excluded from the first stream by the air classifier based, at least in part, on particle size. In certain embodiments, the primary air classifier may comprise a high-efficiency air classifier circuit. In certain embodiments, the primary air classifier may be configured to toggle between cleaning mode and separation mode during operation, to provide the first stream and the reject stream without becoming clogged.

The reject stream may then be provided to a separator, which separates the reject stream based on size to provide the coarse stream and the fine stream. The separator may include any separation unit suitable for sorting the reject stream input into at least a fine stream and a coarse stream. By way of example, the separator may comprise a screener, such as a vibratory screener. The fine stream may comprise glass particles below a predetermined upper threshold size, such as may be defined by a mechanical configuration of the separator. For example, the separator may comprise a screener having at least one screen, with a mesh size of the screen determining which particles are sorted to the fine stream and which particles are sorted to the coarse stream.

The fine stream output from the separator comprises glass particles having a predetermined second particle size range. The predetermined second particle size range may be defined by an upper end size cut-off, or may be defined by an upper end size cut-off and a lower end size cut-off, which may be implemented by configuring settings of the separator accordingly. The predetermined second particle size range may be selected to suit the particular application, such that the fine stream comprises pulverized glass particles each having a particle size which is below an upper threshold size and optionally above a lower threshold size, and having a population mean particle size within the predetermined second particle size range. The fine stream may comprise pulverized glass particles, with a particle size distribution having an upper size cut-off corresponding with the upper threshold size, and optionally having a lower size cut-off corresponding with the lower threshold size.

In certain embodiments of the processes described herein, the predetermined first particle size range and the predetermined second particle size range may be different from each other. In certain embodiments, the predetermined first particle size range and the predetermined second particle size range may be partially overlapping. In certain embodiments, the predetermined first particle size range and the predetermined second particle size range do not overlap. In certain embodiments, the first particle size range may be finer than the second particle size range.

In certain embodiments, the first stream may comprise a D50 of about 30 to about 65 microns. In certain embodiments, the fine stream may comprise a D50 of about 80 to about 210 microns. In certain embodiments, the first stream may comprise a topcut (D98) of about 120 to about 170 microns. In certain embodiments, the fine stream may comprise a topcut (D98) of about 140 to about 400 microns. In certain embodiments, the first stream may comprise a D10 of about 8 to about 15 microns. In certain embodiments, the fine stream may comprise a D10 of about 50 to about 90 microns. In certain further embodiments, one or more of the D50, D98, and/or D10 of the first stream may be defined by any suitable sub-range falling within any of the D50, D98, and/or D10 first stream ranges noted above, respectively, such as any suitable sub-range bounded at lower and upper ends by any integer values (or values rounded to the nearest tenth of a micron) at or between the upper and lower values noted above. In certain further embodiments, one or more of the D50, D98, and/or D10 of the fine stream may be defined by any suitable sub-range falling within any of the D50, D98, and/or D10 fine stream ranges noted above, respectively, such as any suitable sub-range bounded at lower and upper ends by any integer values (or values rounded to the nearest tenth of a micron) at or between the upper and lower values noted above. In certain embodiments, one or more of the D50, D98, and/or D10 of the first stream, the fine stream, or both, may be any suitable integer value (or value rounded to the nearest tenth of a micron) selected from the ranges noted above.

In certain embodiments, the first stream may comprise a pulverized glass within a predetermined first particle size range. In certain embodiments, the predetermined first particle size range may be from about 5 microns (lower) to about 175 microns (upper), or any suitable sub-range falling therebetween, such as a sub-range bounded at lower and upper ends by any integer values (or values rounded to the nearest tenth of a micron) at or between 5 microns and 175 microns.

In certain embodiments, the fine stream may comprise a pulverized glass within a predetermined second particle size range. In certain embodiments, the predetermined second particle size range may be from about 20 microns (lower) to about 420 microns (upper), or any suitable sub-range falling therebetween, such as a sub-range bounded at lower and upper ends by any integer values (or values rounded to the nearest tenth of a micron) at or between 20 microns and 420 microns.

In certain embodiments, the first stream and the fine stream may have one or more properties according to the following:

|  | First Stream: | | | |
| --- | --- | --- | --- | --- |
|  | Lower (micron) | Upper (micron) |  |  |
| D50 | 30 | 65 | Lower Size (micron): | 5 |
| D10 | 8 | 15 | Upper Size (micron): | 175 |
| Topcut (D98) | 120 | 170 |  |  |
|  | Fine Stream: | | | |
|  | Lower (micron) | Upper (micron) |  |  |
| D50 | 80 | 210 | Lower Size (micron): | 20 |
| D10 | 50 | 90 | Upper Size (micron): | 420 |
| Topcut (D98) | 140 | 400 |  |  |

As will be understood, the sizing of the first stream and/or the fine stream may be selected based on the particular application, the system and/or method configuration being used, and/or the desired properties of the resulting product to be produced. Accordingly, it is contemplated that in certain embodiments the sizing of the first stream and/or the fine stream may vary from those described above.

As will be understood, in certain embodiments at least a portion of the first stream and at least a portion of the fine stream may be combined to provide a combined stream. The first stream and the fine stream may be combined using any suitable mixing technique and apparatus known to the person of skill in the art having regard to the teachings herein. By way of example, in an embodiment, the first stream and the combined stream may be combined in an intermediate feed bin, which receives the first stream from the primary air classifier and the fine stream from the separator, and combines the first stream and the fine stream therein to provide the combined stream, which may be a substantially homogenous or substantially heterogeneous mixture of the first stream and the fine stream as already described in detail hereinabove. The ratio of the first stream to the fine stream in the combined stream may comprise any suitable ratio, which may be selected to suit the configuration of the mill and/or the desired properties of the glass powder product output therefrom. In certain embodiments, a ratio of the first stream to the fine stream in the combined stream may be about 60:40 (or another suitable ratio, as described above), and the combined stream may be substantially heterogeneous.

The combined stream may then be provided to a mill, such as a ball mill, for milling the combined stream to provide the glass powder product. Alternatively, in another embodiment, the first stream and the fine stream may be combined by inputting the first stream into the mill, inputting the fine stream into the mill, and combining the first stream and the fine stream in the mill as part of the milling to provide the glass powder product.

As will be understood, the milling of the combined stream may be performed by any suitable milling unit as will be known to the person of skill in the art having regard to the teachings herein.

In certain embodiments, the mill may comprise, for example, a ball mill. The mill may be configured to provide the glass powder product to a particular specification desired for the particular application, as already described hereinabove.

In yet another embodiment, the step of milling the combined stream to provide the glass powder product may comprise milling the combined stream in a ball mill with a charge porosity configured for production of ultra-fines.

In still another embodiment, the fine stream may be milled in a ball mill prior to combining with the first stream.

In certain embodiments of the processes described herein, the process may be a dry or waterless process. Whereas traditionally glass treatment processes have commonly employed a washing step or other wet or liquid treatment, further triggering a need for resource-intensive water removal operations, processes described herein may be performed without such exposure of the glass to liquid. Accordingly, a water removal stage may be omitted, or may be performed for less time and/or at lower temperature, since wetting of the glass may be avoided in the embodiments described herein.

In another embodiment of the processes described herein, the process may further comprise:
   transferring at least a portion of the coarse stream to a crusher, crushing the coarse stream, and repeating the process using the crushed coarse stream as at least a portion of the crushed waste glass.

Accordingly, in certain embodiments, processes described herein may include a recirculation loop, whereby the coarse stream is crushed, and returned to the air classifier for separation to produce additional first stream and/or reject stream. In certain embodiments, the coarse stream may be crushed and then mixed with crushed waste glass being directed to the primary air classifier. In certain embodiments, the coarse stream may be mixed with incoming waste glass input feed, and the coarse stream and incoming waste glass input feed may be crushed to provide the crushed waste glass being sorted at the primary air classifier.

In another embodiment, the process may further comprise steps of:
   optionally, pre-screening the coarse stream to remove large contaminants; and
   treating the coarse stream in an Eddy current separator to remove aluminum or other non-ferrous metals and/or residual plastic before the step of transferring the coarse stream to the crusher.

As will be understood, in certain embodiments, the coarse stream from the separator may be pre-screened, to remove large contaminants therefrom to exclude such large contaminants from further processing.

In certain embodiments, the coarse stream may be treated in an Eddy current separator to remove aluminum and other non-ferrous metals and/or residual plastic therefrom. As will be understood, any suitable Eddy current separator unit known to the person of skill in the art having regard to the teachings herein may be used.

In certain embodiments of the processes described herein, the step of separating the reject stream based on size to provide a coarse stream and a fine stream, the fine stream having a predetermined second particle size range, may comprise:
   screening the reject stream on a screener.

In another embodiment, the screener may comprise at least one screen for separating the reject stream into the coarse stream and the fine stream. In still another embodiment, the screener may be a multi-deck screener comprising an upstream deck with a coarse mesh screen outputting the coarse stream and a downstream deck with a fine mesh screen outputting the fine stream. In certain embodiments, the fine mesh screen of the downstream deck may have a mesh size of about 70 to about 100 mesh, or higher. In still another embodiment, materials which pass through the coarse mesh screen but which do not pass through the fine mesh screen may be output as an intermediate stream. In yet another embodiment, the multi-deck screener may further comprise one or more an intermediate decks each with an intermediate mesh screen, for outputting one or more intermediate streams. In yet another embodiment, the one or more intermediate decks may be for outputting two or more intermediate streams, each having a different particle size range. In still another embodiment, the multi-deck screener may comprise 1 to 3 sequentially arranged intermediate decks of progressively finer mesh size, the intermediate decks arranged downstream of the upstream deck and upstream of the downstream deck. In still another embodiment, wherein the screens of the multi-deck screener may become progressively finer moving through the multi-deck screener.

As will be understood, where an intermediate stream is output from the separator, the process may further comprise
   using at least a portion of at least one intermediate stream to generate another glass-based product;
   transferring at least a portion of at least one intermediate stream to a crusher, which may be the same crusher described above or a different crusher, crushing the intermediate stream, and repeating the process using the crushed intermediate stream as at least a portion of the crushed waste glass;
   or both.

In still another embodiment, where an intermediate stream is output from the separator, the process may further comprise:
   optionally, pre-screening the intermediate stream to remove large contaminants; and
   treating the intermediate stream in an Eddy current separator to remove aluminum or other non-ferrous metals and/or residual plastic before the step of using the intermediate stream or transferring the intermediate stream to the crusher.

As will be understood, in certain embodiments, the intermediate stream from the separator may be pre-screened, to remove large contaminants therefrom to exclude such large contaminants from further processing.

In certain embodiments, the intermediate stream may be treated in an Eddy current separator, which may be the same Eddy current separator described above or a different Eddy current separator, to remove aluminum and other non-ferrous metals and/or residual plastic therefrom. As will be understood, any suitable Eddy current separator unit known to the person of skill in the art having regard to the teachings herein may be used.

In still another embodiment of the processes described herein, the process may further comprise a step of:
   sorting at least a portion of the glass powder product in a secondary air classifier to provide a glass powder product stream within a predetermined particle size range, and a reject glass powder product stream comprising glass powder excluded from the glass powder product stream.

The predetermined particle size range may be defined by an upper end size cut-off, or may be defined by an upper end size cut-off and a lower end size cut-off, which may be implemented by configuring settings of the air classifier accordingly. The predetermined particle size range may be selected to suit the particular application, such that the glass powder product stream comprises pulverized glass particles each having a particle size which is below an upper threshold size and optionally above a lower threshold size, and having a population mean particle size within the predetermined particle size range. The glass powder product stream may comprise pulverized glass particles, with a particle size distribution having an upper size cut-off corresponding with the upper threshold size, and optionally having a lower size cut-off corresponding with the lower threshold size. In certain embodiments, the glass powder product stream may comprise a glass powder product having a particular particle size distribution. In certain embodiments, the glass powder product may comprise a generally leptokurtic particle size distribution. In certain embodiments, the glass powder product stream may comprise ultra-fine glass powder product.

In still another embodiment, the glass powder product, or the glass powder product stream, may comprise an ultra-fine glass powder product having a leptokurtic particle size curve.

In still another embodiment of the processes described herein, the process may further comprise:
   optionally, mixing at least a portion of the reject glass powder product stream with at least a portion of the first stream, at least a portion of the fine stream, or with a combined stream comprising at least a portion of the first stream and at least a portion of the fine stream; and
   re-milling to generate additional glass powder product.

Accordingly, in certain embodiments, processes described herein may include a recirculation loop, whereby the reject glass powder product stream is returned to the mill to produce additional glass powder product stream. In certain embodiments, the reject glass powder product stream may be milled, or may be mixed with additional combined stream, first stream, or fine stream, or both, and milled. In certain embodiments, ratio of the combined stream, the first stream, or the fine stream to the reject glass powder product stream provided to the mill may be adjusted to provide a desired glass powder product output.

In yet another embodiment, the secondary air classifier may be configured to recover ultra-fine glass powder product based on material mass to air mass ratio within the secondary air classifier, thereby providing an ultra-fine glass powder product having a leptokurtic particle size curve as the glass powder product stream.

In still another embodiment of the processes described herein, the glass powder product may comprise a particle size D50 range from about 20 microns to about 1.2 microns.

In another embodiment of the processes described herein, the process may further comprise a step of adjusting the ratio of the first stream to the fine stream in the combined stream to provide the glass powder product as an ultra-fine glass powder product having a target leptokurtic particle size distribution.

As will be understood, in certain embodiments, the process may further comprise an upstream step of:
generating at least a portion of the crushed waste glass or the waste glass input feed from post-consumer waste glass.

In certain embodiments, the step of generating may comprise at least one of:
crushing the post-consumer waste glass;
treating the post-consumer waste glass in a high-temperature dryer to destroy paper, light plastic, and organic contaminants; and
removing ferrous metal contaminants from the post-consumer waste glass.

In yet another embodiment, the step of generating may comprise treating the post-consumer waste glass in the high-temperature dryer, and wherein the high-temperature dryer comprises a rotary kiln dryer. In still another embodiment, the step of generating may comprise treating the post-consumer waste glass in the high-temperature dryer, and may further comprise cooling the post-consumer waste glass on a fluidized bed cooler.

In yet another embodiment, the step of generating may comprise removing ferrous metal contaminants from the post-consumer waste glass, wherein the ferrous metal contaminants may be removed using belt in-line magnets or by being brought into proximity with a magnet in another manner as will be known to the skilled person having regard to the teachings herein.

In yet another embodiment of the processes described herein, at least one vertical impact crusher may be used for crushing to provide the crushed waste glass.

In certain embodiments, the crushed waste glass may comprise glass from post-consumer waste glass which has been color-sorted. In certain embodiments, the crushed waste glass may comprise clear glass, and may be substantially free of colored glass, for example. In yet another embodiment of the processes described herein, the glass powder product may comprise a brightness level at or exceeding 96 L on a standardized CIE scale (65/10 observant).

In yet another embodiment, the processes as described herein may include a step of periodically reversing a direction of a belt used for transporting the coarse stream, in order to clear accumulated large non-glass waste of the coarse stream out of the system and into a trash stream.

In certain embodiments of the processes described herein, the process may further comprise a step of:
adding an anti-static grinding aid to the fine stream, the first stream, or a mixture of the first stream and the fine stream, prior to milling.

In yet another embodiment, the process may further comprise a step of:
subjecting the glass powder product to anti-static air jets to de-ionize the glass powder product and remove static to prevent clumping.

As will be understood, anti-static treatment may, in certain embodiments, include using compressed air through localized jects, inserted in a product transfer line, to mitigate static charges, for example.

In still another embodiment, there is provided herein a process for preparing a glass powder product, the process comprising:
providing a first stream comprising a pulverized glass within a first particle size range;
providing a fine stream comprising a pulverized glass within a second particle size range; and
milling the first stream and the fine stream to provide the glass powder product.

In a further embodiment, the first particle size range and the second particle size range may be distinct. In another embodiment, the first particle size range and the second particle size range may be partially overlapping. In another embodiment, the first particle size range and the second particle size range may not overlap. In yet another embodiment, the first stream may be finer than the fine stream. In certain embodiments, the combined stream may have a bi-modal particle size distribution.

In another embodiment, there is provided herein a process for preparing a glass powder product from a waste glass input feed, the process comprising steps of:
crushing the waste glass input feed in a crusher to provide a crushed waste glass;
sorting the crushed waste glass in a primary air classifier to provide a first stream and a reject stream, the first stream comprising a pulverized glass within a predetermined first particle size range, and the reject stream comprising crushed waste glass excluded from the first stream;
separating the reject stream based on size to provide a coarse stream and a fine stream, the fine stream having a predetermined second particle size range; and
milling the first stream and the fine stream to provide the glass powder product.

In another embodiment, the process may further comprise a step of:
returning the coarse stream to the crusher and using the coarse stream as at least a portion of the waste glass input feed to provide additional crushed waste glass for the process.

Figure 4:
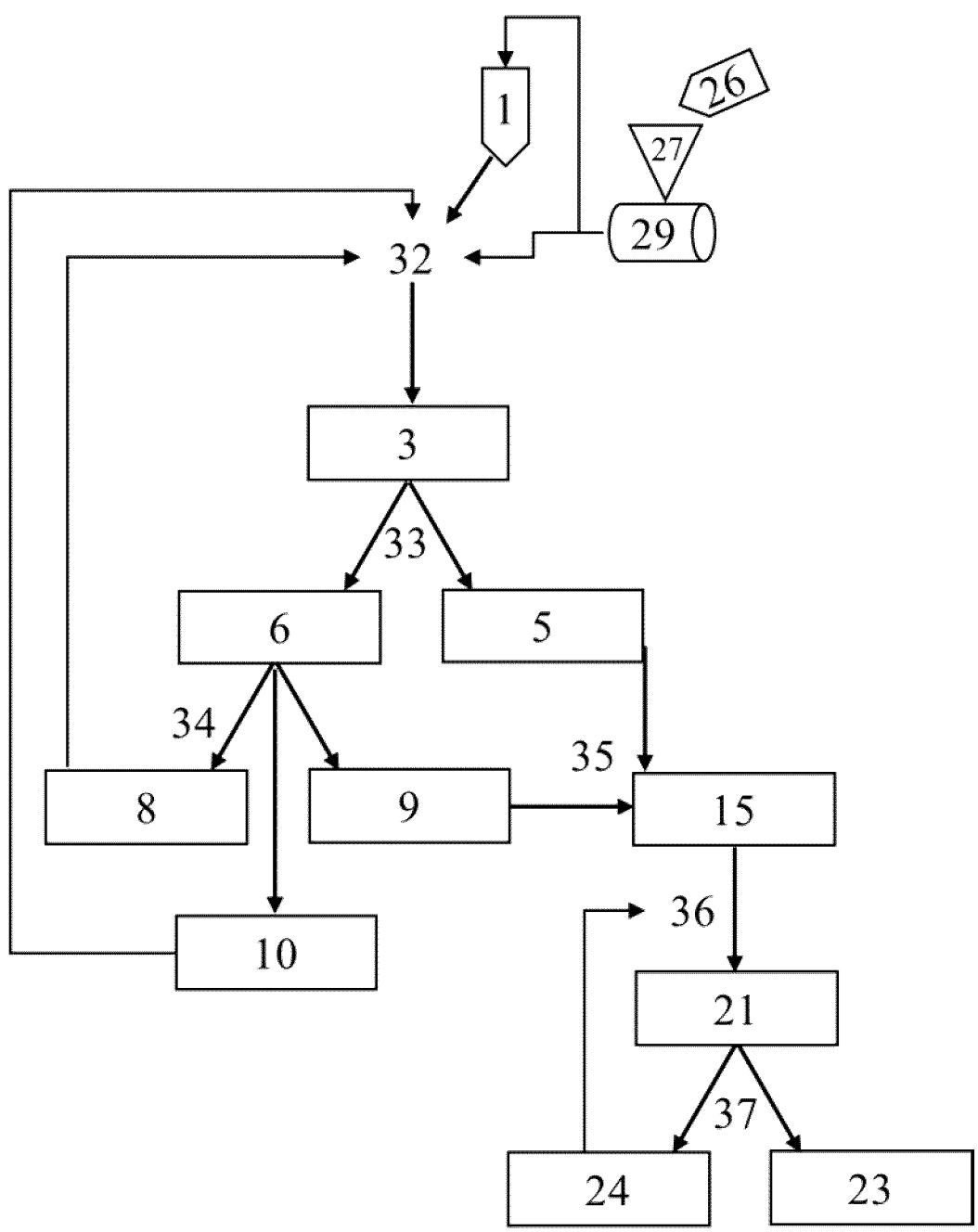
FIG. 4 shows a flow diagram of an embodiment of a process as described herein which may be performed on the system embodiment depicted in FIGS. 1-3.

The systems depicted in FIGS. 1-3 are shown performing an embodiment of a process as described herein. As well, an example of a process for preparing a glass powder product as described herein is depicted in FIG. 4. With reference to FIG. 4, the depicted process example comprises:
providing a crushed waste glass (32);
sorting (33) the crushed waste glass in a primary air classifier (3) to provide a first stream (5) and a reject stream (6), the first stream (5) comprising a pulverized glass within a predetermined first particle size range, and the reject stream (6) comprising crushed waste glass excluded from the first stream (5);

separating (34) the reject stream based on size to provide a coarse stream (8) and a fine stream (9), the fine stream (9) having a predetermined second particle size range;

combining (35) at least a portion of the first stream (5) and at least a portion of the fine stream (9) to provide a combined stream (15); and milling (36) at least a portion the combined stream (15) to provide the glass powder product (21).

In the depicted process embodiment, the crushed waste glass (32) is generated from a waste glass input feed (1) via crushing in a crusher (2), and/or from a post-consumer waste glass (26) which has been crushed in crusher (27) (and/or crushed in crusher (2)) and heated in high temperature dryer (29).

In the depicted process example, the predetermined first particle size range and the predetermined second particle size range are different, and partially overlapping. In the depicted embodiment, the first stream (5) comprises a particle size range of about 45 to about 50 microns, and the fine stream (9) comprises a particle size range of about 177 to about 210 microns.

As shown, the depicted process is a dry process, which does not input water or liquid.

In the depicted process, at least a portion of the coarse stream (8) is transferred to the crusher (2) to generate additional crushed glass waste (32). The coarse stream (8) is added to the crusher (2) along with waste glass input feed (1) and/or post-consumer waste glass, thus generating additional crushed waste glass (32) for repeating the process. In the depicted example, the coarse stream (8) is optionally passed through an Eddy current separator en route to the crusher (2), to remove aluminum or other non-ferrous metals and/or residual plastic therefrom.

In the depicted process, the separating (34) additionally outputs an intermediate stream (10), which may be obtained separately and used for different applications, or may be transferred to crusher (2) to generate additional crushed waste glass (32) for repeating the process. The intermediate stream (10) may be passed through an Eddy current separator en route to the crusher in certain embodiments to remove aluminum or other non-ferrous metals and/or residual plastic.

Accordingly, in the system depicted in FIG. 4, there is a re-circulation loop in which certain materials from the crushed waste glass (32) which are not recovered in the first stream (5) and the fine stream (9) are circulated back, optionally via an Eddy current separator (12), to the crusher (2) and then through the process again.

In the depicted embodiment, the combining (35) may include adjusting the ratio of the first stream (5) to the fine stream (9) making up the combined stream (15), by adjusting feed rates of the first stream and the fine stream to the mixing unit (16), or otherwise controlling the ratio thereof in the combined stream (15).

As shown in FIG. 4, the depicted process comprises milling (36) of the combined stream (15) to provide the glass powder product (21), the glass powder product (21) comprising an ultra-fine glass powder product having a target leptokurtic particle size distribution.

As shown in FIG. 4, the depicted process example further comprises separating (37) the glass powder product (21) using a secondary air classifier to sort the glass powder product (21) to provide a glass powder product stream (23) within a predetermined particle size range, and a reject glass powder product stream (24) comprising glass powder excluded from the glass powder product stream (23). The reject glass powder product stream (24) may then be returned back for further milling (36) either alone or mixed with the combined stream (15) to generate additional glass powder product (21) or glass powder product stream (23). The ratio of the reject glass powder product stream (24) to the combined stream (15) may be adjusted to provide a desired glass powder product (21) following milling.

Thus, in the depicted embodiment, the process comprises a second recirculation loop, whereby reject glass powder product stream (24) is recirculated for re-milling (36) to generate additional glass powder product (21) and/or glass powder product stream (23).

In the depicted process, the secondary air classifier is configured to recover ultra-fine glass powder product based on material mass to air mass ratio within the secondary air classifier (22), thereby providing an ultra-fine glass powder product having a leptokurtic particle size curve as the glass powder product stream (23).

Although not shown, the depicted system may further comprise an upstream milling unit, wherein the fine stream (9) is milled prior to combining with the first stream (5) at the mixing unit (16).

As well, although not shown, the depicted process may further comprise adding an anti-static grinding aid to the combined stream (15) prior to milling (36); and/or may comprise exposing the glass powder product (21) and/or glass powder product stream (23) to antistatic air jets configured to remove static therefrom.

As will also be understood, in certain embodiments, it is contemplated that the primary air classifier and separator configuration depicted in FIG. 1 may alternatively be configured with a single separator unit (i.e. a vibratory screener, for example). Accordingly, in certain embodiments, there is provided herein a process for preparing a glass powder product, the process comprising steps of:

providing a crushed waste glass;

sorting the crushed waste glass with a separator to provide a first stream comprising a pulverized glass within a predetermined first particle size range, and a fine stream having a predetermined second particle size range; and milling at least a portion of first stream and at least a portion of the fine stream to provide the glass powder product.

An example of such a process (being performed on a system as described herein) is depicted in FIGS. 6(A) and 6(B), as are already described in detail hereinabove.

Glass Powder Products

Also provided herein are glass powder products having particular properties which may be desirable for use as, for example, a filler and/or extender in a paint, coating, or adhesive. In certain embodiments, such glass powder products may be produced by processes and/or systems as described herein.

In certain embodiments, there is provided herein a glass powder product comprising one or more of: a brightness L* CIE of about 96% or greater; a color neutrality CIE with an a* value range of about −0.05 to about 0.45 and a b* value range of about −0.15 to about 0.80; a yellow index ASTM 313 of about −0.4 to about 1.5; a gloss value range at 20 deg on a glossmeter of about 1.6 to about 1.8 as measured in a test paint (ASTM D523); a gloss value range at 60 deg on a glossmeter of about 6 to about 7 as measured in a test paint (ASTM D523); a gloss value range at 85 deg on a glossmeter of about 9.5 to about 18 as measured in a test paint (ASTM D523); a gloss value range at 60 deg on a glossmeter of about 1.3 to about 2.5 (ASTM D523) as measured on a powder pellet; a white index (ASTM 313) of at least about 91; a particle size range based on mean of about 1.5 to about 22 microns; a specific surface area range of about 9000 to about 27000 cm$^2$/mL; a particle size D50 of about 1.2 to about 20 microns; a particle size D10 of about 0.7 microns to about 5 microns; a particle size D98 of about 6 microns to about 55 microns; a leptokurtic particle size distribution; a refractive index of about 1.5; a round or angular particle shape; or a micro-crystalline silica content of about 0; or any combination thereof. As will be understood, references herein to ranges may be understood as including embodiments having sub-ranges falling within the recited ranges, bounded on upper and lower ends by values (either integer values, or values rounded to the nearest 0.1, for example) from within the recited ranges.

Figure 5:
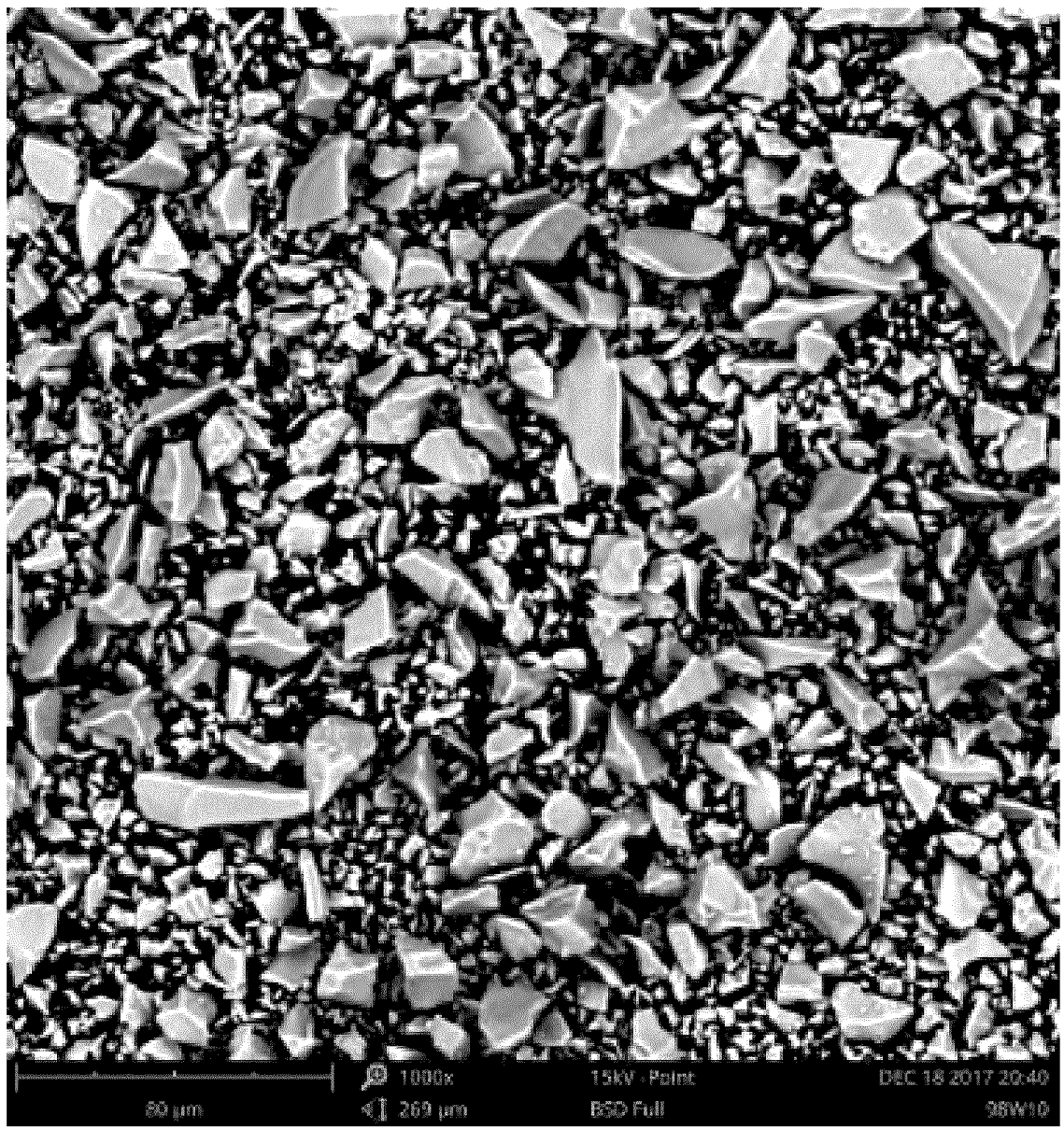
FIG. 5 shows a 1000×SEM microscopy image of an example of a glass powder product produced according to the processes described herein.

Various characteristics of an example of a glass powder product produced according to a method as described herein using a system as described herein are provided below, in comparison with characteristics measured in-house for other comparator products (comparator Minex) or with characteristics obtained from brochures/tech sheets (other glass or silica based comparator products).

examples); may be resistant in most acidic formations; and/or may have a substantially angular particle shape (see FIG. 5).

As will be understood, in certain embodiments, the glass powder products described herein may be for use a filler and/or extended. By way of example, glass powder products described herein may be for use as a filler and/or extended in paint or another such coating or an adhesive. In certain embodiments, glass powder products as described herein may be for use in flat to gloss paints (interior and/or exterior). In certain embodiments, glass powder products as described herein may have a pH of about 10, and therefore may in certain embodiments, be used in acidic coatings/adhesives.

In certain embodiments, glass powder products described herein may be for use at least partially replacing conventional fillers/extenders such as Minex. In certain embodiments, glass powder products described herein may replace conventional fillers/extenders at a near 1:1 ratio by weight.

In certain embodiments, there is also provided herein a paint comprising a glass powder product as described herein as a filler and/or extender, or an adhesive comprising a glass powder product as described herein as a filler and/or extender.

| Property | Glass Powder Product Example | Comparator (Minex) | Other glass or silica based comparator products |
|---|---|---|---|
| Brightness (CIE L*, a*, b*) | 96% or greater; mean 97% | 95%+ | 85 to 93% |
| Color Neutrality (CIE a*, b*) | a* value range: −.05 to .45<br>b* value range: −.15 to 0.80 | a* 0 to 0.40<br>b* >1.0 | a* −.5 to 1.5<br>b* value range: −.5 to 1.80 |
| Yellow Index (ASTM 313) | −0.4 to 1.5 | >2.0 | 2-3.5 |
| White Index (ASTM 313) | About 91 or more | 88-90 | — |
| Particle Size-Range (based on mean) | 1.5 to 22 microns | Minex has similar range; | others typically stop at 6 to 8 microns |
| Specific surface area-Range | 9,000 to 27,000 (cm2/mL) | 13,000 to 32,000 (cm2/mL) | — |
| Particle Size- D10 | 5 u down to 0.7 u | Minex: 0.3 micron to 0.5 micron lower at D10 | Others typically don't go below 1.5 u |
| Particle Size-D98 | 55 u down to 6 u | Minex coarse to fine products: 40 u down to 12 u | Similar |
| Particle Size Distribution | Predominately leptokurtic | Predominately leptokurtic | Predominately platykurtic |
| Refractive index | 1.5 | 1.58 | 1.5-1.6 |
| Particle shape | Round to angular | Angular | angular |
| Composition | Glass (preferably, recycled glass) | Naturally occurring nepheline syenite mineral | Glass or 100% Silica |
| Gloss (ASTM D 523 Gloss on Comparative Paint Samples) | 20 deg: 1.6-1.8<br>60 deg: 6-7<br>85 deg: 9.5-18 | 20 deg: 1.6-1.8<br>60 deg: 6-7<br>85 deg: 10-18 | — |
| Gloss (ASTM D523) on powder pellet | 60 deg: about 1.3 to about 2.5 | Similar range | — |
| Micro-crystalline silica | 0 (as all glass is amorphous) | Depends on detection limits | 0 for glass; may contain for natural silica products |

In certain embodiments, the glass powder products may comprise a generally leptokurtic particle size distribution. In certain embodiments, the glass powder product may comprise a particle size D50 range of from about 20 microns to about 1.2 microns, or from about 10 microns to about 2 microns. In certain embodiments, the glass powder product may comprise a brightness level at or exceeding about 96 L on a standardized CIE scale (65/10 observant).

In certain embodiments, glass powder products may be free of crystalline silica; may have low oil absorption; may have a low refractive index (i.e. about 1.5 in certain Example 1—Generation of Glass Powder Products This example describes an example run which was performed using a system similar to that depicted in FIGS. 1 and 2 to produce a glass powder product.

Figure 9:
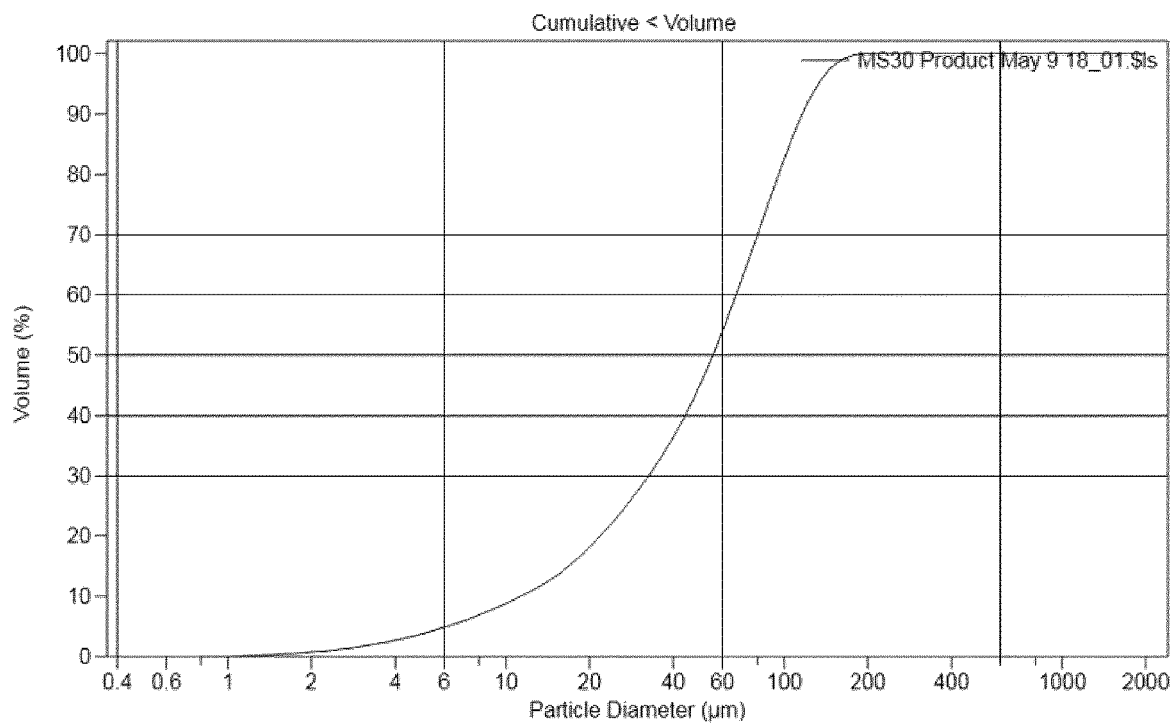
FIG. 9 shows a Particle Size Distribution (PSD) for the first stream in Example 1.
Figure 10:
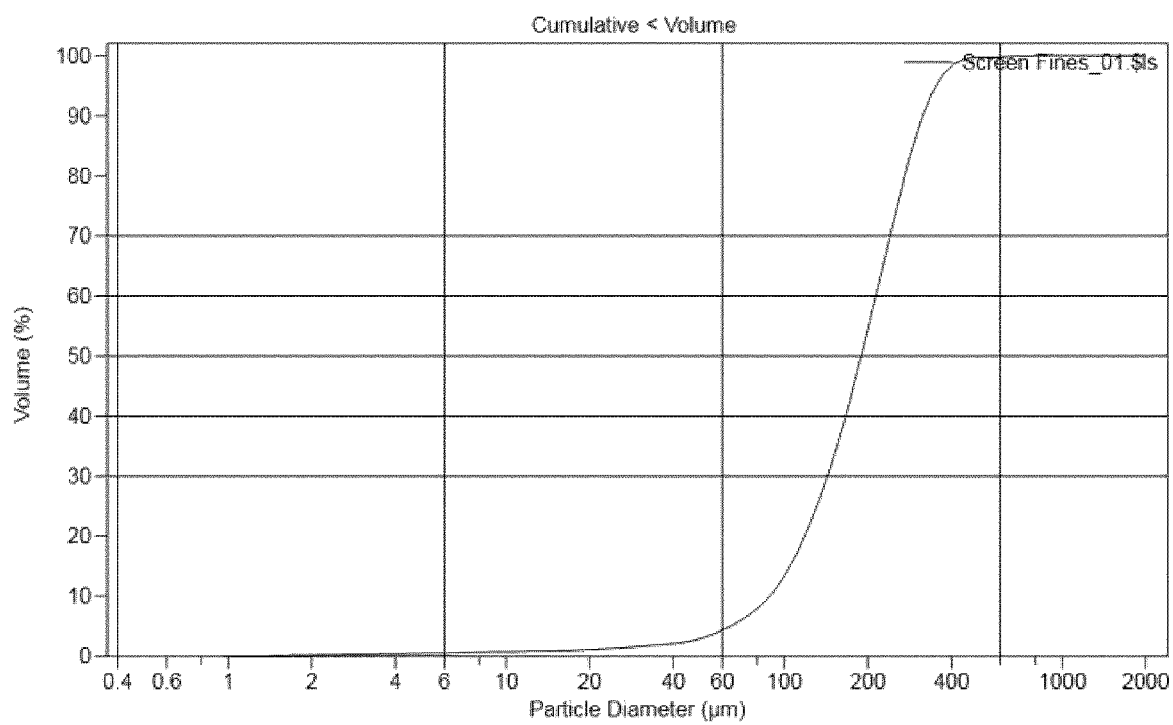
FIG. 10 shows a Particle Size Distribution (PSD) for the fine stream in Example 1.

The system was configured as follows:

Primary air classifier speed: 265 to 400 rpm;

Primary air classifier fan rpm: 1000-1400 rpm;

First stream: D50 of 50 to 65 microns (Particle Size Distribution (PSD) curve shown in FIG. 9);

Screen Deck (i.e. separator) settings:
  Deck 1 #4 Mesh TBC
  Deck 2 #16 Mesh TBC
  Deck 3 #28 Mesh TBC
  Deck 4 #70-100 Mesh TBC
  Deck 5 #58 Mesh TBC (screen failure trap only);
Products produced: A 16-30 mesh abrasive grit intermediate product (produced from intermediate screen deck 3 (which has passed through deck 2), for use in abrasive products), and a fine stream (which is product which has passed through deck 4; Particle Size Distribution PSD curve shown in FIG. 10) for mill feed.

The 16-30 Grit intermediate product particle size (by sieve, rather than laser unit, due to size) is shown in the following Table (three separate runs, and an average, are shown):

| | Run 1 | | Run 2 | | Run 3 | | Average | |
|---|---|---|---|---|---|---|---|---|
| Mesh (Micron) | Retained | Cum. Passing | Mesh (Micron) | Retained | Cum. Passing | Mesh (Micron) | Retained | Cum. Passing | Mesh (Micron) | Retained | Cum. Passing |
| 14 | 0.01% | 99.99% | 14 | 0.01% | 99.99% | 14 | 0.00% | | 14 | | 99.99% |
| 16 (1190) | 0.72% | 99.27% | (1190) | 0.59% | 99.40% | (1190) | 0.43% | 99.57% | (1190) | | 99.41% |
| 20 (841) | 45.61% | 53.66% | 20 (841) | 41.98% | 57.41% | 20 (841) | 37.71% | 61.86% | 20 (841) | | 57.64% |
| 30 (595) | 33.18% | 20.48% | 30 (595) | 34.23% | 23.18% | 30 (595) | 36.61% | 25.25% | 30 (595) | | 22.97% |
| 40 (400) | 18.61% | 1.87% | 40 (400) | 21.04% | 2.14% | 40 (400) | 23.25% | 2.00% | 40 (400) | | 2.00% |
| 60 (250) | 1.58% | 0.29% | 60 (250) | 1.88% | 0.25% | 60 (250) | 1.77% | 0.23% | 60 (250) | | 0.26% |
| 100 (149) | 0.15% | 0.14% | 100 | 0.11% | 0.14% | 100 | 0.12% | 0.12% | 100 | | 0.13% |
| Color: | White | | Color: | White | | Color: | White | | Color: | White | |

The first stream and the fine stream were combined in common storage silo, and used to supply a mill feed bin. The ratio of first stream to fine stream was about 60:40.

The glass powder product was produced as by milling, using the following configuration:
  Fresh feed addition: 0.5 to 1 tph;
  Recirculation feed: 4-6 tph;
  Mill Speed: 59 rpm (78% of critical);
  Mill Classifier speed: 900-1000 rpm;
  Mill Classifier Fan speed: 1500-1800 rpm; and
  Grinding aid rate of 300 mL/ton.

Characterization of the thus produced glass powder product provided the following results:
  D50 of 9;
  Topcut (D98) of 26;
  Specific Surface of 10,000-11000 cm2/mL;
  Brightness: 96.4 L;
  a* 0.27;
  b* 0.13;
  Yellow Index: 0.75.

Gloss values of glass powder products produced according to methods described herein were also of interest, as well as coloring. In this regard, two samples of glass powder products produced according to methods described herein (the two samples being produced similarly to that described in this Example, and each having a different D50 value which is within the range spanning from about 1.2 microns to about 20 microns), and gloss and color characteristics were measured and compared with those of particle size comparators Minex 4 and Minex 7. Glass Powder Product A was coarser than Glass Powder Product B. Results are shown in the Table below:

| Sample (D65 III/10 deg) | |
|---|---|
| L | |
| a | |
| b | |
| Y | |
| x | |
| y | |
| Rx | |
| Ry | |
| Rz | |
| WI (ASTM 313) | |
| Yellowness (ASTM 313-98) | |
| Gloss 60 deg (Material pellet ASTM D523) | |

| Glass Powder Product A | MINEX 4 |
|---|---|
| 96.68 | 96.84 |
| 0.11 | 0.19 |
| −0.06 | 1.03 |
| 91.67 | 92.06 |
| 0.3139 | 0.3159 |
| 0.3308 | 0.3328 |
| 92.77 | 93.6 |
| 91.67 | 92.06 |
| 91.75 | 90.6 |
| 91.85 | 87.44 |
| 0 | 2.1 |
| 2.1 | 2.1 |

| Glass Powder Product B | MINEX 7 |
|---|---|
| 96.84 | 96.98 |
| 0.06 | 0.13 |
| 0.06 | 0.86 |
| 92.04 | 92.38 |
| 0.314 | 0.3155 |
| 0.3311 | 0.3325 |
| 93.15 | 93.84 |
| 92.04 | 92.38 |
| 91.95 | 91.16 |
| 91.76 | 88.5 |
| 0.16 | 1.73 |
| 2.1 | 2 |

Figure 8:
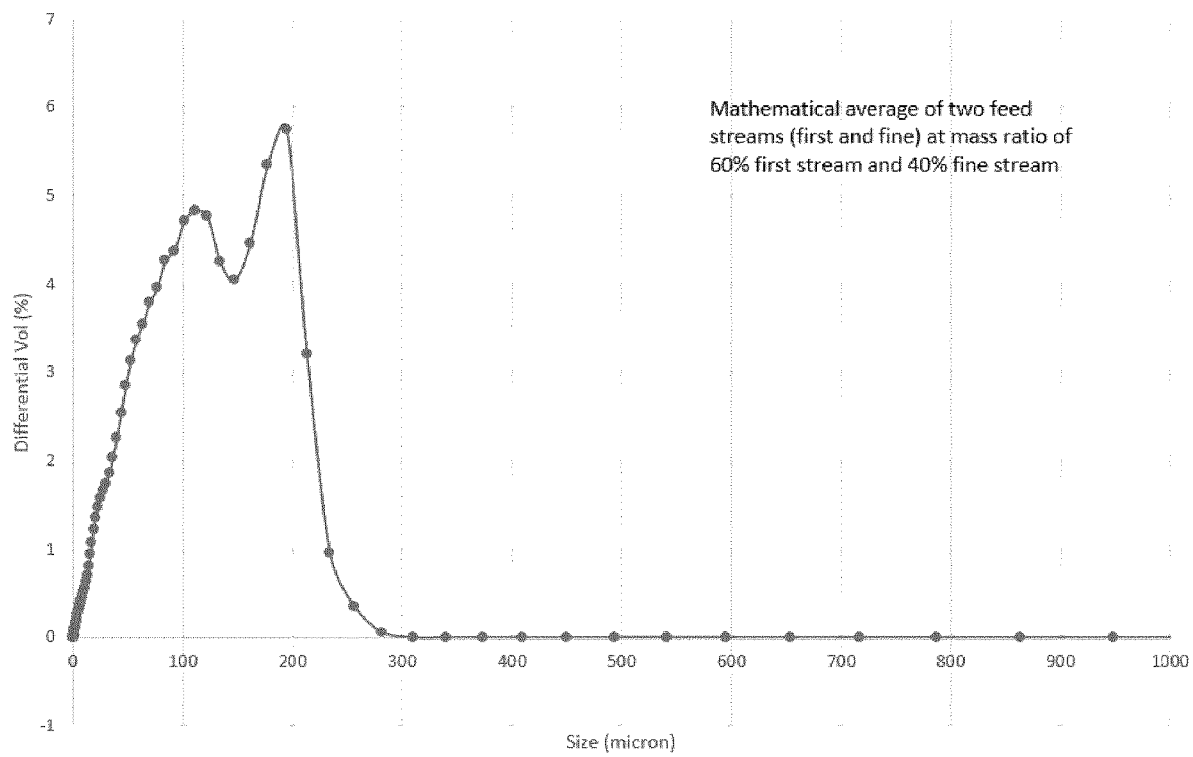
FIG. 8 shows another example of a particle size distribution of an example of a combined stream comprising a first stream and a fine stream, having a bimodal particle size distribution. The combined stream is a mixture of first and fine streams at a mass ratio of about 60% first stream, and about 40% fine stream, as described in Example 2.

Example 2—Example of a Combined Stream Comprising a First Stream and a Fine Stream Particle size distribution of another example of a combined stream comprising an example of a first stream and an example of a fine stream as described herein is shown in FIG. 8. The combined stream has a bimodal particle size distribution, and comprises a mixture of first and fine streams at a mass ratio of about 60% first stream, and about 40% fine stream. As described herein, using first and fine streams such as these may provide a bimodal feedstock, milling of which may provide a glass powder product having desirable properties such as, for example, a leptokurtic particle size distribution.

FIG. 8 shows a combined stream (comprising first and fine streams) represented using differential volume % (volume histogram). This is indicative of primary operational mode. X axis is the particle size in microns, Y axis is the Volume % of equivalent sphere (laser diffraction analysis is the method used for analysis here, which measures the light scattering of an equivalent sphere using Mie theory). Throughout the examples herein, unless otherwise stated, particle size data for powders is with reference to determination by laser diffraction, and hence values are described on a volume basis.

The following table provides measurements for the first, fine, and combined streams in this Example, providing background data used for generating the chart in FIG. 8. The table shows an example of output from a size analysis on a laser machine. For each representative sphere diameter, a volume % is given. Adding each successive volume gives a cumulative volume or a certain equivalent size.

| Screen Fines (Fine Stream) (40%) | | | MS30 Fines (First Stream) (60%) | | | Combined Stream | | | |
| --- | --- | --- | --- | --- | --- | --- | --- | --- | --- |
| Channel Diameter (Lower) um | Diff. Volume % | Cum. < Volume % | Channel Diameter (Lower) um | Diff. Volume % | Cum. < Volume % | Channel Diameter (Lower) um | Diff. Volume % | | Cum. < Volume % |
| 0.375 | 0 | 0 | 0.375 | 0 | 0 | 0.375 | 0 | 0.375 | 0 |
| 0.412 | 0 | 0 | 0.412 | 0 | 0 | 0.412 | 0 | 0.412 | 0 |
| 0.452 | 0 | 0 | 0.452 | 0 | 0 | 0.452 | 0 | 0.452 | 0 |
| 0.496 | 0 | 0 | 0.496 | 0 | 0 | 0.496 | 0 | 0.496 | 0 |
| 0.545 | 0 | 0 | 0.545 | 0.000028 | 0 | 0.545 | 1.68E−05 | 0.545 | 1.68E−05 |
| 0.598 | 0 | 0 | 0.598 | 0.00033 | 0.000028 | 0.598 | 0.000198 | 0.598 | 0.000215 |
| 0.657 | 0 | 0 | 0.657 | 0.0019 | 0.00036 | 0.657 | 0.00114 | 0.657 | 0.001355 |
| 0.721 | 0.0002 | 0 | 0.721 | 0.0059 | 0.0023 | 0.721 | 0.00362 | 0.721 | 0.004975 |
| 0.791 | 0.0026 | 0.0002 | 0.791 | 0.014 | 0.0082 | 0.791 | 0.00944 | 0.791 | 0.014415 |
| 0.869 | 0.0081 | 0.0083 | 0.869 | 0.024 | 0.022 | 0.869 | 0.01764 | 0.869 | 0.032055 |
| 0.954 | 0.013 | 0.0213 | 0.954 | 0.037 | 0.046 | 0.954 | 0.0274 | 0.954 | 0.059455 |
| 1.047 | 0.018 | 0.0393 | 1.047 | 0.052 | 0.084 | 1.047 | 0.0384 | 1.047 | 0.097855 |
| 1.149 | 0.021 | 0.0603 | 1.149 | 0.067 | 0.14 | 1.149 | 0.0486 | 1.149 | 0.146455 |
| 1.261 | 0.023 | 0.0833 | 1.261 | 0.083 | 0.2 | 1.261 | 0.059 | 1.261 | 0.205455 |
| 1.385 | 0.025 | 0.1083 | 1.385 | 0.099 | 0.29 | 1.385 | 0.0694 | 1.385 | 0.274855 |
| 1.52 | 0.025 | 0.1333 | 1.52 | 0.12 | 0.38 | 1.52 | 0.082 | 1.52 | 0.356855 |
| 1.669 | 0.025 | 0.1583 | 1.669 | 0.13 | 0.5 | 1.669 | 0.088 | 1.669 | 0.444855 |
| 1.832 | 0.025 | 0.1833 | 1.832 | 0.15 | 0.63 | 1.832 | 0.1 | 1.832 | 0.544855 |
| 2.011 | 0.025 | 0.2083 | 2.011 | 0.17 | 0.78 | 2.011 | 0.112 | 2.011 | 0.656855 |
| 2.208 | 0.025 | 0.2333 | 2.208 | 0.19 | 0.95 | 2.208 | 0.124 | 2.208 | 0.780855 |
| 2.423 | 0.025 | 0.2583 | 2.423 | 0.21 | 1.14 | 2.423 | 0.136 | 2.423 | 0.916855 |
| 2.66 | 0.026 | 0.2843 | 2.66 | 0.24 | 1.35 | 2.66 | 0.1544 | 2.66 | 1.071255 |
| 2.92 | 0.027 | 0.3113 | 2.92 | 0.26 | 1.59 | 2.92 | 0.1668 | 2.92 | 1.238055 |
| 3.206 | 0.028 | 0.3393 | 3.206 | 0.3 | 1.86 | 3.206 | 0.1912 | 3.206 | 1.429255 |
| 3.519 | 0.03 | 0.3693 | 3.519 | 0.33 | 2.15 | 3.519 | 0.21 | 3.519 | 1.639255 |
| 3.863 | 0.032 | 0.4013 | 3.863 | 0.37 | 2.48 | 3.863 | 0.2348 | 3.863 | 1.874055 |
| 4.241 | 0.033 | 0.4343 | 4.241 | 0.41 | 2.85 | 4.241 | 0.2592 | 4.241 | 2.133255 |
| 4.656 | 0.035 | 0.4693 | 4.656 | 0.45 | 3.26 | 4.656 | 0.284 | 4.656 | 2.417255 |
| 5.111 | 0.036 | 0.5053 | 5.111 | 0.49 | 3.7 | 5.111 | 0.3084 | 5.111 | 2.725655 |
| 5.611 | 0.037 | 0.5423 | 5.611 | 0.53 | 4.19 | 5.611 | 0.3328 | 5.611 | 3.058455 |
| 6.159 | 0.038 | 0.5803 | 6.159 | 0.58 | 4.73 | 6.159 | 0.3632 | 6.159 | 3.421655 |
| 6.761 | 0.038 | 0.6183 | 6.761 | 0.62 | 5.31 | 6.761 | 0.3872 | 6.761 | 3.808855 |
| 7.422 | 0.037 | 0.6553 | 7.422 | 0.67 | 5.93 | 7.422 | 0.4168 | 7.422 | 4.225655 |
| 8.148 | 0.037 | 0.6923 | 8.148 | 0.72 | 6.6 | 8.148 | 0.4468 | 8.148 | 4.672455 |
| 8.944 | 0.036 | 0.7283 | 8.944 | 0.77 | 7.31 | 8.944 | 0.4764 | 8.944 | 5.148855 |
| 9.819 | 0.036 | 0.7643 | 9.819 | 0.84 | 8.09 | 9.819 | 0.5184 | 9.819 | 5.667255 |
| 10.78 | 0.037 | 0.8013 | 10.78 | 0.91 | 8.92 | 10.78 | 0.5608 | 10.78 | 6.228055 |
| 11.83 | 0.039 | 0.8403 | 11.83 | 1.02 | 9.84 | 11.83 | 0.6276 | 11.83 | 6.855655 |
| 12.99 | 0.043 | 0.8833 | 12.99 | 1.15 | 10.9 | 12.99 | 0.7072 | 12.99 | 7.562855 |
| 14.26 | 0.049 | 0.9323 | 14.26 | 1.31 | 12 | 14.26 | 0.8056 | 14.26 | 8.368455 |
| 15.65 | 0.058 | 0.9903 | 15.65 | 1.52 | 13.3 | 15.65 | 0.9352 | 15.65 | 9.303655 |
| 17.18 | 0.069 | 1.0593 | 17.18 | 1.74 | 14.8 | 17.18 | 1.0716 | 17.18 | 10.37525 |
| 18.86 | 0.081 | 1.1403 | 18.86 | 1.98 | 16.6 | 18.86 | 1.2204 | 18.86 | 11.59565 |
| 20.71 | 0.096 | 1.2363 | 20.71 | 2.2 | 18.5 | 20.71 | 1.3584 | 20.71 | 12.95405 |
| 22.73 | 0.11 | 1.3463 | 22.73 | 2.39 | 20.7 | 22.73 | 1.478 | 22.73 | 14.43205 |
| 24.95 | 0.13 | 1.4763 | 24.95 | 2.54 | 23.1 | 24.95 | 1.576 | 24.95 | 16.00805 |
| 27.39 | 0.14 | 1.6163 | 27.39 | 2.67 | 25.7 | 27.39 | 1.658 | 27.39 | 17.66605 |
| 30.07 | 0.14 | 1.7563 | 30.07 | 2.81 | 28.3 | 30.07 | 1.742 | 30.07 | 19.40805 |
| 33.01 | 0.15 | 1.9063 | 33.01 | 3 | 31.2 | 33.01 | 1.86 | 33.01 | 21.26805 |
| 36.24 | 0.18 | 2.0863 | 36.24 | 3.26 | 34.1 | 36.24 | 2.028 | 36.24 | 23.29605 |
| 39.78 | 0.25 | 2.3363 | 39.78 | 3.59 | 37.4 | 39.78 | 2.254 | 39.78 | 25.55005 |
| 43.67 | 0.38 | 2.7163 | 43.67 | 3.97 | 41 | 43.67 | 2.534 | 43.67 | 28.08405 |

-continued

| Screen Fines (Fine Stream) (40%) | | | MS30 Fines (First Stream) (60%) | | | Combined Stream | | | |
| --- | --- | --- | --- | --- | --- | --- | --- | --- | --- |
| Channel Diameter (Lower) um | Diff. Volume % | Cum. < Volume % | Channel Diameter (Lower) um | Diff. Volume % | Cum. < Volume % | Channel Diameter (Lower) um | Diff. Volume % | | Cum. < Volume % |
| 47.94 | 0.55 | 3.2663 | 47.94 | 4.37 | 45 | 47.94 | 2.842 | 47.94 | 30.92605 |
| 52.63 | 0.73 | 3.9963 | 52.63 | 4.73 | 49.3 | 52.63 | 3.13 | 52.63 | 34.05605 |
| 57.77 | 0.89 | 4.8863 | 57.77 | 5.02 | 54.1 | 57.77 | 3.368 | 57.77 | 37.42405 |
| 63.42 | 1.05 | 5.9363 | 63.42 | 5.2 | 59.1 | 63.42 | 3.54 | 63.42 | 40.96405 |
| 69.62 | 1.56 | 7.4963 | 69.62 | 5.27 | 64.3 | 69.62 | 3.786 | 69.62 | 44.75005 |
| 76.43 | 2.05 | 9.5463 | 76.43 | 5.22 | 69.5 | 76.43 | 3.952 | 76.43 | 48.70205 |
| 83.9 | 3.06 | 12.6063 | 83.9 | 5.06 | 74.8 | 83.9 | 4.26 | 83.9 | 52.96205 |
| 92.1 | 3.76 | 16.3663 | 92.1 | 4.78 | 79.8 | 92.1 | 4.372 | 92.1 | 57.33405 |
| 101.1 | 5.22 | 21.5863 | 101.1 | 4.36 | 84.6 | 101.1 | 4.704 | 101.1 | 62.03805 |
| 111 | 6.42 | 28.0063 | 111 | 3.76 | 89 | 111 | 4.824 | 111 | 66.86205 |
| 121.8 | 7.42 | 35.4263 | 121.8 | 3 | 92.7 | 121.8 | 4.768 | 121.8 | 71.63005 |
| 133.7 | 7.41 | 42.8363 | 133.7 | 2.14 | 95.7 | 133.7 | 4.248 | 133.7 | 75.87805 |
| 146.8 | 8.16 | 50.9963 | 146.8 | 1.3 | 97.9 | 146.8 | 4.044 | 146.8 | 79.92205 |
| 161.2 | 10.23 | 61.2263 | 161.2 | 0.61 | 99.2 | 161.2 | 4.458 | 161.2 | 84.38005 |
| 176.9 | 13.06 | 74.2863 | 176.9 | 0.19 | 99.8 | 176.9 | 5.338 | 176.9 | 89.71805 |
| 194.2 | 14.32 | 88.6063 | 194.2 | 0.032 | 99.97 | 194.2 | 5.7472 | 194.2 | 95.46525 |
| 213.2 | 7.98 | 96.5863 | 213.2 | 0.002 | 99.998 | 213.2 | 3.1932 | 213.2 | 98.65845 |
| 234.1 | 2.38 | 98.9663 | 234.1 | 0 | 100 | 234.1 | 0.952 | 234.1 | 99.61045 |
| 256.9 | 0.874 | 99.8403 | 256.9 | 0 | 100 | 256.9 | 0.3496 | 256.9 | 99.96005 |
| 282.1 | 0.15 | 99.9903 | 282.1 | 0 | 100 | 282.1 | 0.06 | 282.1 | 100.0201 |
| 309.6 | 0 | 99.9903 | 309.6 | 0 | 100 | 309.6 | 0 | 309.6 | 100.0201 |
| 339.9 | 0 | 99.9903 | 339.9 | 0 | 100 | 339.9 | 0 | 339.9 | 100.0201 |
| 373.1 | 0 | 99.9903 | 373.1 | 0 | 100 | 373.1 | 0 | 373.1 | 100.0201 |
| 409.6 | 0 | 99.9903 | 409.6 | 0 | 100 | 409.6 | 0 | 409.6 | 100.0201 |
| 449.7 | 0 | 99.9903 | 449.7 | 0 | 100 | 449.7 | 0 | 449.7 | 100.0201 |
| 493.6 | 0 | 99.9903 | 493.6 | 0 | 100 | 493.6 | 0 | 493.6 | 100.0201 |
| 541.9 | 0 | 99.9903 | 541.9 | 0 | 100 | 541.9 | 0 | 541.9 | 100.0201 |
| 594.9 | 0 | 99.9903 | 594.9 | 0 | 100 | 594.9 | 0 | 594.9 | 100.0201 |
| 653 | 0 | 99.9903 | 653 | 0 | 100 | 653 | 0 | 653 | 100.0201 |
| 716.9 | 0 | 99.9903 | 716.9 | 0 | 100 | 716.9 | 0 | 716.9 | 100.0201 |
| 786.9 | 0 | 99.9903 | 786.9 | 0 | 100 | 786.9 | 0 | 786.9 | 100.0201 |
| 863.9 | 0 | 99.9903 | 863.9 | 0 | 100 | 863.9 | 0 | 863.9 | 100.0201 |
| 948.3 | 0 | 100 | 948.3 | 0 | 100 | 948.3 | 0 | 948.3 | 100.0201 |
| 1041 | 0 | 100 | 1041 | 0 | 100 | 1041 | 0 | 1041 | 100.0201 |
| 1143 | 0 | 100 | 1143 | 0 | 100 | 1143 | 0 | 1143 | 100.0201 |
| 1255 | 0 | 100 | 1255 | 0 | 100 | 1255 | 0 | 1255 | 100.0201 |
| 1377 | 0 | 100 | 1377 | 0 | 100 | 1377 | 0 | 1377 | 100.0201 |
| 1512 | 0 | 100 | 1512 | 0 | 100 | 1512 | 0 | 1512 | 100.0201 |
| 1660 | 0 | 100 | 1660 | 0 | 100 | 1660 | 0 | 1660 | 100.0201 |
| 1822 | 0 | 100 | 1822 | 0 | 100 | 1822 | 0 | 1822 | 100.0201 |
| 2000 | | 100 | 2000 | | 100 | 2000 | 0 | 2000 | 100.0201 |

One or more illustrative embodiments have been described by way of example. It will be understood to persons skilled in the art that a number of variations and modifications can be made without departing from the scope of the invention as defined in the claims.

What is claimed is:

1. A process for preparing an ultra-fine glass powder product having a leptokurtic particle size distribution curve, the process comprising steps of:
   providing a crushed waste glass;
   sorting the crushed waste glass in a primary air classifier to provide a first stream and a reject stream, the first stream comprising a pulverized glass within a predetermined first particle size range, and the reject stream comprising crushed waste glass excluded from the first stream;
   separating the reject stream based on size to provide a coarse stream and a fine stream, the fine stream having a predetermined second particle size range; and
   milling at least a portion of the first stream and at least a portion of the fine stream to provide the ultra-fine glass powder product;
   wherein the ultra-fine glass powder product has a mean particle size of about 1.5 microns to about 22 microns.

2. The process of claim 1, wherein the step of providing the crushed waste glass comprises providing a waste glass input feed, and crushing the waste glass input feed to provide the crushed waste glass.

3. The process of claim 1, wherein the predetermined first particle size range and the predetermined second particle size range are different.

4. The process of claim 3, wherein the predetermined first particle size range and the predetermined second particle size range are partially overlapping.

5. The process of claim 3, wherein the predetermined first particle size range and the predetermined second particle size range do not overlap.

6. The process of claim 1, wherein the process is a dry process.

7. The process of claim 1, further comprising:
   transferring at least a portion of the coarse stream to a crusher, crushing the coarse stream, and repeating the process using the crushed coarse stream as at least a portion of the crushed waste glass.

8. The process of claim 7, further comprising:
optionally, pre-screening the coarse stream to remove large contaminants; and
treating the coarse stream in an Eddy current separator to remove aluminum or other non-ferrous metals and/or residual plastic before the step of transferring the coarse stream to the crusher.

9. The process of claim 1, wherein the step of separating comprises:
screening the reject stream on a screener.

10. The process of claim 9, wherein the screener comprises at least one screen for separating the reject stream into the coarse stream and the fine stream.

11. The process of claim 9, wherein the screener is a multi-deck screener comprising an upstream deck with a coarse mesh screen outputting the coarse stream and a downstream deck with a fine mesh screen outputting the fine stream.

12. The process of claim 11, wherein the fine mesh screen of the downstream deck has a mesh size of about 70 to about 100 mesh, or higher.

13. The process of claim 11, wherein materials which pass through the coarse mesh screen but which do not pass through the fine mesh screen are output as an intermediate stream.

14. The process of claim 11, wherein the multi-deck screener further comprises one or more intermediate decks each with an intermediate mesh screen, for outputting one or more intermediate streams.

15. The process of claim 14, wherein the one or more intermediate decks are for outputting two or more intermediate streams, each having a different particle size range.

16. The process of claim 14, wherein the multi-deck screener comprises 1 to 3 sequentially arranged intermediate decks of progressively finer mesh size, the intermediate decks arranged downstream of the upstream deck and upstream of the downstream deck.

17. The process of claim 11, wherein the screens of the multi-deck screener become progressively finer moving through the multi-deck screener.

18. The process of claim 13, further comprising:
using at least a portion of at least one intermediate stream to generate another glass-based product;
transferring at least a portion of at least one intermediate stream to a crusher, crushing the intermediate stream, and repeating the process using the crushed intermediate stream as at least a portion of the crushed waste glass;
or both.

19. The process according to claim 1, further comprising:
sorting at least a portion of the glass powder product in a secondary air classifier to provide a glass powder product stream within a predetermined particle size range, and a reject glass powder product stream comprising glass powder excluded from the glass powder product stream.

\* \* \* \* \*